(12) United States Patent
Versteyhe et al.

(10) Patent No.: US 9,347,532 B2
(45) Date of Patent: May 24, 2016

(54) TILTING BALL VARIATOR CONTINUOUSLY VARIABLE TRANSMISSION TORQUE VECTORING DEVICE

(71) Applicant: Dana Limited, Maumee, OH (US)

(72) Inventors: Mark R. J. Versteyhe, Oostkamp (BE); Thibaut E. Duchene, Woluwe-Saint-Lambert (BE); Matthias W. J. Byltiauw, Hooglede (BE)

(73) Assignee: DANA LIMITED, Maumee, OH (US)

( * ) Notice: Subject to any disclaimer, the term of this patent is extended or adjusted under 35 U.S.C. 154(b) by 191 days.

(21) Appl. No.: 13/743,951

(22) Filed: Jan. 17, 2013

(65) Prior Publication Data

US 2013/0190131 A1    Jul. 25, 2013

Related U.S. Application Data

(60) Provisional application No. 61/598,973, filed on Feb. 15, 2012, provisional application No. 61/588,272, filed on Jan. 19, 2012.

(51) Int. Cl.
*F16H 15/40* (2006.01)
*B60K 23/04* (2006.01)
*F16H 15/28* (2006.01)
(Continued)

(52) U.S. Cl.
CPC ............... *F16H 15/40* (2013.01); *B60K 23/04* (2013.01); *F16H 15/28* (2013.01); *F16H 15/52* (2013.01); *B60K 17/20* (2013.01); *B60K 2023/043* (2013.01); *F16H 48/12* (2013.01); *F16H 2048/362* (2013.01)

(58) Field of Classification Search
CPC ..... F16H 15/40; F16H 15/52; F16H 2048/362; Y10T 74/19005
USPC ...................... 475/184, 189; 476/38
See application file for complete search history.

(56) References Cited

U.S. PATENT DOCUMENTS 1,063,244 A    6/1913   Dieterich
1,215,969 A    2/1917   Murray
(Continued)

FOREIGN PATENT DOCUMENTS

AU    2011224083 A1    10/2011
CN    101617146 A    12/2009
(Continued)

OTHER PUBLICATIONS

Moore et al, A Three Revolute Cobot Using CVTs in Parallel, Proceedings of IMECE, 1999, 6 pgs.
(Continued)

*Primary Examiner* — William C Joyce
(74) *Attorney, Agent, or Firm* — Wilson Sonsini Goodrich & Rosati

(57) ABSTRACT

A torque vectoring device includes a drive member engaged with a power source, a plurality of variator ball assemblies configured to be tiltable and rotatable with respect to the drive member, a first output frictionally engaged with the variator ball assemblies, and a second output frictionally engaged with the variator ball assemblies. A torque distribution between the first output and the second output may be adjusted by tilting the plurality of variator ball assemblies. The variator ball assemblies also facilitate a differential action between the first output and the second output.

10 Claims, 4 Drawing Sheets

(51) Int. Cl.
*F16H 15/52* (2006.01)
*B60K 17/16* (2006.01)
*F16H 48/12* (2012.01)
*F16H 48/36* (2012.01)

(56) References Cited

U.S. PATENT DOCUMENTS

| | | | |
|---|---|---|---|
| 1,526,140 A | 2/1925 | Gruver | |
| 2,019,006 A | 10/1935 | Ferrari | |
| 2,060,884 A | 11/1936 | Madle | |
| 2,405,201 A | 8/1946 | Franck | |
| 2,660,897 A | 12/1953 | Neidhart et al. | |
| 2,729,118 A | 1/1956 | Emslie | |
| 2,931,235 A | 4/1960 | Hayward | |
| 3,203,278 A | 8/1965 | General | |
| 3,407,687 A * | 10/1968 | Hayashi | 475/189 |
| 3,470,720 A | 10/1969 | Eklund et al. | |
| 3,583,060 A | 6/1971 | Sigmans | |
| 3,765,270 A | 10/1973 | Lemieux | |
| 3,774,280 A | 11/1973 | Eklund et al. | |
| 3,831,245 A | 8/1974 | Amos | |
| 3,894,559 A | 7/1975 | DePuy | |
| 4,046,988 A | 9/1977 | Okuda et al. | |
| 4,226,140 A | 10/1980 | Gaasenbeek | |
| 4,333,358 A | 6/1982 | Grattapaglia | |
| 4,368,572 A | 1/1983 | Kanazawa et al. | |
| 4,464,952 A | 8/1984 | Stubbs | |
| 4,693,134 A | 9/1987 | Kraus | |
| 4,731,044 A | 3/1988 | Mott | |
| 4,756,211 A | 7/1988 | Fellows | |
| 4,784,017 A | 11/1988 | Johnshoy | |
| 4,856,371 A | 8/1989 | Kemper | |
| 4,856,374 A | 8/1989 | Kreuzer | |
| 4,950,208 A | 8/1990 | Tomlinson | |
| 4,963,122 A * | 10/1990 | Ryan | 475/184 |
| 4,963,124 A | 10/1990 | Takahashi et al. | |
| 5,109,962 A | 5/1992 | Sato | |
| 5,217,412 A | 6/1993 | Indlekofer et al. | |
| 5,230,670 A | 7/1993 | Hibi | |
| 5,238,460 A | 8/1993 | Esaki et al. | |
| 5,318,486 A | 6/1994 | Lutz | |
| 5,390,759 A | 2/1995 | Gollner | |
| 5,401,221 A | 3/1995 | Fellows et al. | |
| 5,520,588 A | 5/1996 | Hall, III | |
| 5,527,231 A | 6/1996 | Seidel et al. | |
| 5,577,423 A | 11/1996 | Mimura | |
| 5,599,251 A | 2/1997 | Beim et al. | |
| 5,659,956 A | 8/1997 | Braginsky et al. | |
| 5,683,322 A | 11/1997 | Meyerle | |
| 5,726,353 A | 3/1998 | Matsuda et al. | |
| 5,730,678 A | 3/1998 | Larkin | |
| 5,766,105 A | 6/1998 | Fellows et al. | |
| 5,776,028 A | 7/1998 | Matsuda et al. | |
| 5,800,303 A | 9/1998 | Benford | |
| 5,860,888 A | 1/1999 | Lee | |
| 5,915,801 A | 6/1999 | Taga et al. | |
| 5,971,883 A | 10/1999 | Klemen | |
| 5,996,226 A | 12/1999 | Gibbs | |
| 6,009,365 A | 12/1999 | Takahara et al. | |
| 6,045,477 A | 4/2000 | Schmidt | |
| 6,053,839 A | 4/2000 | Baldwin et al. | |
| 6,059,685 A | 5/2000 | Hoge et al. | |
| 6,071,208 A | 6/2000 | Koivunen | |
| 6,080,080 A | 6/2000 | Bolz et al. | |
| 6,083,135 A | 7/2000 | Baldwin et al. | |
| 6,086,504 A | 7/2000 | Illerhaus | |
| 6,089,287 A | 7/2000 | Welsh et al. | |
| 6,095,942 A | 8/2000 | Yamaguchi et al. | |
| 6,155,951 A | 12/2000 | Kuhn et al. | |
| 6,217,474 B1 | 4/2001 | Ross et al. | |
| 6,251,038 B1 | 6/2001 | Ishikawa et al. | |
| 6,273,838 B1 | 8/2001 | Park | |
| 6,342,026 B1 | 1/2002 | Takagi et al. | |
| 6,358,178 B1 | 3/2002 | Wittkopp | |
| 6,371,880 B1 | 4/2002 | Kam | |
| 6,481,258 B1 | 11/2002 | Belinky | |
| 6,554,735 B2 | 4/2003 | Kanazawa | |
| 6,558,285 B1 | 5/2003 | Sieber | |
| 6,585,619 B2 | 7/2003 | Henzler | |
| 6,609,994 B2 | 8/2003 | Muramoto | |
| 6,641,497 B2 | 11/2003 | Deschamps et al. | |
| 6,645,106 B2 | 11/2003 | Goo | |
| 6,705,964 B2 | 3/2004 | Nagai et al. | |
| 6,719,659 B2 | 4/2004 | Geiberger et al. | |
| 6,723,016 B2 | 4/2004 | Sumi | |
| 6,726,590 B2 | 4/2004 | Henzler et al. | |
| 6,733,412 B2 | 5/2004 | Kumagai et al. | |
| 6,752,696 B2 | 6/2004 | Murai et al. | |
| 6,793,603 B2 | 9/2004 | Teraoka et al. | |
| 6,849,020 B2 | 2/2005 | Sumi | |
| 6,866,606 B2 | 3/2005 | Ooyama | |
| 6,949,045 B2 | 9/2005 | Wafzig et al. | |
| 6,979,275 B2 | 12/2005 | Hiraku et al. | |
| 7,033,298 B2 | 4/2006 | Usoro et al. | |
| 7,074,154 B2 | 7/2006 | Miller | |
| 7,104,917 B2 | 9/2006 | Klemen et al. | |
| 7,128,681 B2 | 10/2006 | Sugino et al. | |
| 7,160,220 B2 | 1/2007 | Shinojima et al. | |
| 7,186,199 B1 | 3/2007 | Baxter, Jr. | |
| 7,234,543 B2 | 6/2007 | Schaaf | |
| 7,288,044 B2 | 10/2007 | Gumpoltsberger | |
| 7,335,126 B2 | 2/2008 | Tsuchiya et al. | |
| 7,347,801 B2 | 3/2008 | Guenter et al. | |
| 7,396,309 B2 | 7/2008 | Heitz et al. | |
| 7,431,677 B2 | 10/2008 | Miller et al. | |
| 7,470,210 B2 | 12/2008 | Miller et al. | |
| 7,473,202 B2 | 1/2009 | Morscheck et al. | |
| 7,485,069 B2 | 2/2009 | Jang et al. | |
| 7,497,798 B2 | 3/2009 | Kim | |
| 7,588,514 B2 | 9/2009 | McKenzie et al. | |
| 7,637,838 B2 | 12/2009 | Gumpoltsberger | |
| 7,672,770 B2 | 3/2010 | Inoue et al. | |
| 7,686,729 B2 | 3/2010 | Miller et al. | |
| 7,717,815 B2 | 5/2010 | Tenberge | |
| 7,727,107 B2 | 6/2010 | Miller | |
| 7,780,566 B2 | 8/2010 | Seo | |
| 7,874,153 B2 | 1/2011 | Behm | |
| 7,878,935 B2 | 2/2011 | Lahr | |
| 7,951,035 B2 | 5/2011 | Platt | |
| 7,980,972 B1 | 7/2011 | Starkey et al. | |
| 8,029,401 B2 | 10/2011 | Johnson | |
| 8,052,569 B2 | 11/2011 | Tabata et al. | |
| 8,062,175 B2 | 11/2011 | Krueger et al. | |
| 8,066,614 B2 | 11/2011 | Miller et al. | |
| 8,142,323 B2 | 3/2012 | Tsuchiya et al. | |
| 8,226,518 B2 | 7/2012 | Parraga | |
| 8,257,216 B2 | 9/2012 | Hoffman | |
| 8,257,217 B2 | 9/2012 | Hoffman | |
| 8,287,414 B2 | 10/2012 | Weber et al. | |
| 8,313,404 B2 | 11/2012 | Carter et al. | |
| 8,382,636 B2 | 2/2013 | Shiina et al. | |
| 8,545,368 B1 | 10/2013 | Davis et al. | |
| 8,594,867 B2 | 11/2013 | Heap et al. | |
| 8,639,419 B2 | 1/2014 | Roli et al. | |
| 8,678,975 B2 | 3/2014 | Koike | |
| 8,870,711 B2 | 10/2014 | Pohl et al. | |
| 8,888,643 B2 | 11/2014 | Lohr et al. | |
| 8,926,468 B2 | 1/2015 | Versteyhe et al. | |
| 8,986,150 B2 | 3/2015 | Versteyhe et al. | |
| 9,114,799 B2 | 8/2015 | Tsukamoto et al. | |
| 9,156,463 B2 | 10/2015 | Legner | |
| 2002/0004438 A1 | 1/2002 | Toukura et al. | |
| 2002/0094911 A1 | 7/2002 | Haka | |
| 2002/0169048 A1 | 11/2002 | Henzler et al. | |
| 2003/0060318 A1 | 3/2003 | Sumi | |
| 2003/0181280 A1 | 9/2003 | Elser et al. | |
| 2003/0200783 A1 | 10/2003 | Shai | |
| 2003/0213125 A1 | 11/2003 | Chiuchang | |
| 2003/0216121 A1 | 11/2003 | Yarkosky | |
| 2003/0228952 A1 | 12/2003 | Joe et al. | |
| 2004/0058769 A1 | 3/2004 | Larkin | |
| 2004/0061639 A1 | 4/2004 | Voigtlaender et al. | |
| 2004/0166984 A1 | 8/2004 | Inoue | |
| 2004/0171452 A1 | 9/2004 | Miller et al. | |

(56) References Cited

U.S. PATENT DOCUMENTS

| | | |
|---|---|---|
| 2005/0102082 A1 | 5/2005 | Joe et al. |
| 2005/0137046 A1 | 6/2005 | Miller et al. |
| 2005/0153810 A1 | 7/2005 | Miller et al. |
| 2006/0234822 A1 | 10/2006 | Morscheck et al. |
| 2007/0021259 A1 | 1/2007 | Tenberge |
| 2007/0032327 A1 | 2/2007 | Raghavan et al. |
| 2007/0042856 A1 | 2/2007 | Greenwood |
| 2007/0072732 A1 | 3/2007 | Klemen |
| 2007/0096556 A1 | 5/2007 | Kokubo et al. |
| 2007/0270270 A1 | 11/2007 | Miller et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0121487 A1 | 5/2008 | Miller et al. |
| 2008/0185201 A1 | 8/2008 | Bishop |
| 2009/0017959 A1 | 1/2009 | Triller |
| 2009/0048054 A1 | 2/2009 | Tsuchiya et al. |
| 2009/0062064 A1 | 3/2009 | Kamada et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093476 A1 | 4/2010 | Carter et al. |
| 2010/0093479 A1 | 4/2010 | Carter et al. |
| 2010/0106386 A1 | 4/2010 | Krasznai et al. |
| 2010/0113211 A1 | 5/2010 | Schneider et al. |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca Alves et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0230297 A1 | 9/2011 | Shiina et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0231925 A1 | 9/2012 | Shiina et al. |
| 2012/0244990 A1 | 9/2012 | Ogawa et al. |
| 2012/0309579 A1 | 12/2012 | Miller et al. |
| 2013/0130859 A1 | 5/2013 | Lundberg et al. |
| 2013/0133965 A1 | 5/2013 | Books |
| 2013/0184115 A1 | 7/2013 | Urabe et al. |
| 2013/0226416 A1 | 8/2013 | Seipold et al. |
| 2013/0303325 A1 | 11/2013 | Carey et al. |
| 2013/0304344 A1 | 11/2013 | Abe |
| 2014/0194242 A1 | 7/2014 | Cooper |
| 2014/0194243 A1 | 7/2014 | Versteyhe et al. |
| 2014/0223901 A1 | 8/2014 | Versteyhe et al. |
| 2014/0274536 A1 | 9/2014 | Versteyhe et al. |
| 2014/0274552 A1 | 9/2014 | Frink et al. |
| 2015/0024899 A1 | 1/2015 | Phillips |
| 2015/0111683 A1 | 4/2015 | Versteyhe |
| 2015/0204429 A1 | 7/2015 | Versteyhe |
| 2015/0204430 A1 | 7/2015 | Versteyhe |
| 2015/0226294 A1 | 8/2015 | Ziech et al. |
| 2015/0226298 A1 | 8/2015 | Versteyhe |
| 2015/0226299 A1 | 8/2015 | Cooper et al. |
| 2015/0252881 A1 | 9/2015 | Versteyhe |
| 2015/0354676 A1 | 12/2015 | Versteyhe et al. |

FOREIGN PATENT DOCUMENTS

| | | |
|---|---|---|
| DE | 1237380 B | 3/1967 |
| DE | 3245045 A1 | 6/1984 |
| DE | 102005010751 | 9/2006 |
| EP | 0210053 A2 | 7/1985 |
| EP | 0156936 A1 | 10/1985 |
| EP | 1061288 | 12/2000 |
| EP | 2113056 | 7/2012 |
| FR | 1030702 A | 6/1953 |
| FR | 1472282 A | 3/1967 |
| FR | 2280451 A1 | 2/1976 |
| FR | 2918433 | 1/2009 |
| GB | 1127825 A | 9/1968 |
| GB | 2248895 A2 | 4/1992 |
| JP | H-09-119506 | 5/1997 |
| JP | 2008180214 A | 8/2008 |
| JP | 2011153583 A | 8/2011 |
| WO | WO2006/002457 | 1/2006 |
| WO | WO2006/041718 | 4/2006 |
| WO | WO2007/046722 | 4/2007 |
| WO | WO2007/051827 | 5/2007 |
| WO | WO2008/103543 | 8/2008 |
| WO | WO2011/011991 | 2/2011 |
| WO | WO2012/008884 | 1/2012 |
| WO | WO-2012177187 A1 | 12/2012 |
| WO | WO2013/109723 | 7/2013 |
| WO | WO2013/123117 | 8/2013 |
| WO | WO2014/039438 | 3/2014 |
| WO | WO2014/039439 | 3/2014 |
| WO | WO2014/039440 | 3/2014 |
| WO | WO2014/039447 | 3/2014 |
| WO | WO2014/039448 | 3/2014 |
| WO | WO2014/039708 | 3/2014 |
| WO | WO2014/039713 | 3/2014 |
| WO | WO2014/039846 | 3/2014 |
| WO | WO2014/039900 | 3/2014 |
| WO | WO2014/039901 | 3/2014 |
| WO | WO2014/078583 | 5/2014 |
| WO | WO-2014124291 A1 | 8/2014 |
| WO | WO2014/151889 | 9/2014 |
| WO | WO2014/159755 | 10/2014 |
| WO | WO2014/159756 | 10/2014 |
| WO | WO2014/165259 | 10/2014 |
| WO | WO2014/179717 | 11/2014 |
| WO | WO2014/179719 | 11/2014 |
| WO | WO2014/186732 | 11/2014 |
| WO | WO2014/197711 | 12/2014 |
| WO | WO-2015059601 A1 | 4/2015 |
| WO | WO-2015073883 A1 | 5/2015 |
| WO | WO-2015073887 A1 | 5/2015 |
| WO | WO-2015073948 A2 | 5/2015 |

OTHER PUBLICATIONS

PCT/US2013/021890 International Search Report dated Apr. 10, 2013.
PCT/US2013/026037 International Search Report dated Jul. 15, 2013.
PCT/US2013/057837 International Search Report and Written Opinion dated Mar. 31, 2014.
PCT/US2013/057866 International Search Report dated Feb. 11, 2014.
PCT/US2013/058309 International Search Report and Written Opinion dated Feb. 11, 2014.
PCT/US2013/058318 International Search Report and Written Opinion dated Feb. 11, 2014.
PCT/US2013/058545 International Search Report and Written Opinion dated Feb. 19, 2014.
PCT/US2013/058616 International Search Report and Written Opinion dated Feb. 11, 2014.
PCT/US2013/070177 International Search Report and Written Opinion dated Apr. 14, 2014.
PCT/US2013/57838 International Search Report and Written Opinion dated Jan. 17, 2014.
PCT/US2013/57839 International Search Report and Written Opinion dated Feb. 6, 2014.

(56) References Cited

OTHER PUBLICATIONS

PCT/US2013/57868 International Search Report and Written Opinion dated Apr. 9, 2014.
PCT/US2013/58615 International Search Report and Written Opinion dated Feb. 11, 2014.
PCT/US2014/25001 International Search Report and Written Opinion dated Jul. 14, 2014.
PCT/US2014/25005 International Search Report and Written Opinion dated Jul. 14, 2014.
PCT/US2014/25004 International Search Report and Written Opinion dated Jul. 14, 2014.
U.S. Appl. No. 61/819,414, filed May 3, 2013, Phillips et al.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
PCT/US2013/026037 International Preliminary Report on Patentability dated Aug. 28, 2014.
PCT/US2014/036623 International Search Report and Written Opinion dated Sep. 4, 2014.
PCT/US2014/26619 International Search Report and Written Opinion dated Sep. 9, 2014.
PCT/US2014/036621 International Search Report and Written Opinion dated Sep. 4, 2014.
U.S. Appl. No. 14/017,054 Office Action dated Aug. 27, 2014.
Wong. The Temple of VTEC Asia Special Focus on the Multimatic Transmission. Temple of VTEC Asia. 2000.
PCT/US2014/038439 International Search Report and Written Opinion dated Sep. 30, 2014.
PCT/US2014/041124 International Search Report and Written Opinion dated Oct. 15, 2014.
U.S. Appl. No. 14/017,054 Office Action dated Dec. 12, 2014.
PCT/US2014/65796 International Search Report and Written Opinion dated Apr. 9, 2015.
PCT/US2014/65792 International Search Report and Written Opinion dated Apr. 9, 2015.
Co-pending U.S. Appl. No. 14/542,336, filed Nov. 14, 2014.
Co-pending U.S. Appl. No. 14/622,038, filed Feb. 13, 2015.
PCT/US2013/057838 International Preliminary Report on Patentability dated Mar. 19, 2015.
PCT/US2013/057868 International Preliminary Report on Patentability dated Mar. 19, 2015.
PCT/US2013/058309 International Preliminary Report on Patentability dated Mar. 19, 2015.
PCT/US2013/058318 International Preliminary Report on Patentability dated Mar. 19, 2015.
PCT/US2013/058545 International Preliminary Report on Patentability dated Mar. 19, 2015.
PCT/US2013/058615 International Preliminary Report on Patentability dated Mar. 19, 2015.
PCT/US2013/058616 International Preliminary Report on Patentability dated Mar. 19, 2015.
PCT/US2014/065909 International Search Report and Written Opinion dated Feb. 19, 2015.
PCT/US2013/021890 International Preliminary Report on Patentability dated Jul. 31, 2014.
PCT/US2013/057837 International Preliminary Report on Patentability dated Mar. 19, 2015.
PCT/US2013/057839 International Preliminary Report on Patentability dated Mar. 19, 2015.
PCT/US2013/057866 International Preliminary Report on Patentability dated Mar. 19, 2015.
PCT/US2013/070177 International Preliminary Report on Patentability dated May 28, 2015.
Co-pending U.S. Appl. No. 14/925,813, filed Oct. 28, 2015.
PCT/US2014/015352 International Search Report and Written Opinion dated May 27, 2014.
PCT/US2014/025001 International Preliminary Report on Patentability dated Sep. 24, 2015.
PCT/US2014/025004 International Preliminary Report on Patentability dated Oct. 1, 2015.
PCT/US2014/025005 International Preliminary Report on Patentability dated Oct. 1, 2015.
PCT/US2014/026619 International Preliminary Report on Patentability dated Sep. 24, 2015.
PCT/US2014/036621 International Preliminary Report on Patentability dated Nov. 12, 2015.
PCT/US2014/036623 International Preliminary Report on Patentability dated Nov. 12, 2015.
PCT/US2014/038439 International Preliminary Report on Patentability dated Nov. 26, 2015.
PCT/US2014/065796 International Preliminary Report on Patentability dated Nov. 6, 2015.
PCT/US2015/37916 International Search Report and Written Opinion dated Sep. 29, 2015.
U.S. Appl. No. 14/175,584 Office Action dated Apr. 2, 2015.
U.S. Appl. No. 14/175,584 Office Action dated Dec. 3, 2015.
U.S. Appl. No. 14/210,130 Office Action dated Nov. 20, 2015.
U.S. Appl. No. 14/426,139 Office Action dated Oct. 6, 2015.
U.S. Appl. No. 14/542,336 Office Action dated Nov. 25, 2015.
U.S. Appl. No. 60/616,399, filed Oct. 5, 2004.
PCT/US2014/065909 Written Opinion dated Dec. 11, 2015.
PCT/US2014/041124 International Preliminary Report on Patentability dated Dec. 17, 2015.
PCT/US2015/36170 International Search Report and Written Opinion dated Dec. 17, 2015.
Co-pending U.S. Appl. No. 15/067,427, filed Mar. 11, 2016.
Co-pending U.S. Appl. No. 15/067,752, filed Mar. 11, 2016.
U.S. Appl. No. 14/378,750 Office Action dated Apr. 8, 2016.

* cited by examiner

TILTING BALL VARIATOR CONTINUOUSLY VARIABLE TRANSMISSION TORQUE VECTORING DEVICE

CLAIM OF PRIORITY

The present application claims priority to and incorporates by reference U.S. Provisional Application No. 61/598,973 filed Feb. 15, 2012, entitled "TILTING BALL VARIATOR CONTINUOUSLY VARIABLE TRANSMISSION TORQUE VECTORING DEVICE" and U.S. Provisional Application No. 61/588,272 filed Jan. 19, 2012, entitled "TILTING BALL VARIATOR TORQUE VECTORING DEVICE."

BACKGROUND OF THE INVENTION

Vehicles including a torque vectoring device have many advantages over vehicles not including torque vectoring devices. In addition to performing a differential function between wheels or axles of a vehicle, the torque vectoring device may be configured to vary torque between wheels or axles of a vehicle at the request of a control system of the vehicle or by an operator of the vehicle.

Conventionally, torque vectoring devices disposed between wheels of a vehicle may include a pair of clutches which may be individually engaged in response to a detected "slip" condition. Engagement of one or both of the clutches directs torque from one wheel to another or balances a torques distribution therebetween. Such clutches typically include a plurality of clutch plates, biasing members, and at least one actuator. The conventional torque vectoring device including clutches tends to be expensive, bulky, and difficult to service.

Torque vectoring devices disposed between axles of a vehicle, such as between the front and rear axle of a passenger vehicle, are configured to distribute torque between the axles according to a design of the torque vectoring device. As described hereinabove, the torque vectoring device disposed between axles of a vehicle may also include a clutch to direct torque from one axle in another in response to a driving condition. As non-limiting examples, such a torque vectoring device may be configured with a planetary style differential or a bevel gear style differential, each of which distribute torque between the axles based on the design of the differential incorporated into the torque vectoring device. As a result, the torque vectoring device is limited to a narrow range of possible torque distributions between the axles during ordinary operation of the vehicle or a range of torque distributions in response to detected driving conditions.

Torque vectoring devices disposed between wheels of a vehicle may be configured to adjust a drive ratio between an input of the torque vectoring device and the axles according to a design of the torque vectoring device. Conventionally, the drive ratio may be adjusted through selection of a drive pinion and a crown gear. Such an arrangement provides a single, non-adjustable, underdrive or overdrive adjustment to the gear ratio. As a result, the torque vectoring device is typically limited to a single ratio adjustment between the input of the torque vectoring device and the axles.

It would be advantageous to develop a torque vectoring device that is inexpensive, compact, easy to service, able of performing a differential function, may be configured for a for a wide range of torque distributions, and able to adjust a drive ratio.

SUMMARY OF THE INVENTION

Presently provided by the invention, a torque vectoring device that is inexpensive, compact, easy to service, able of performing a differential function, may be configured for a for a wide range of torque distributions, and able to adjust a drive ratio, has surprisingly been discovered.

In one embodiment, the present invention is directed to a torque vectoring device. The torque vectoring device includes a drive member drivingly engaged with a power source, a plurality of spherical adjusters drivingly engaged with the drive member, each of the spherical adjusters configured to be tiltable and rotatable with respect to the drive member, a first output frictionally engaged with a surface of at least a portion of the spherical adjusters to transmit torque from the drive member to the first output, and a second output frictionally engaged with a surface of at least a portion of the spherical adjusters to transmit torque from the drive member to the second output. A torque distribution between the first output and the second output may be adjusted by tilting at least a portion of the plurality of spherical adjusters and the spherical adjusters facilitate a differential action between the first output and the second output.

In another embodiment, the present invention is directed to a torque vectoring device. The torque vectoring device includes a drive member drivingly engaged with a power source, an array of rollers drivingly engaged with the drive member, a first array of spherical adjusters drivingly engaged with the array of rollers, each of the spherical adjusters configured to be tiltable and rotatable with respect to the drive member, a second array of spherical adjusters drivingly engaged with the array of rollers, each of the spherical adjusters configured to be tiltable and rotatable with respect to the drive member, a first output frictionally engaged with a surface of the first array of spherical adjusters to transmit torque from the drive member to the first output, and a second output frictionally engaged with a surface of the second array of spherical adjusters to transmit torque from the drive member to the second output. A torque distribution between the first output and the second output may be adjusted by tilting at least a portion of the plurality of spherical adjusters and the spherical adjusters facilitate a differential action between the first output and the second output.

In a third embodiment, the present invention is directed to a torque vectoring device. The torque vectoring device includes a drive member drivingly engaged with a power source, a plurality of drive pinions drivingly engaged with the drive member, a first input member drivingly engaged with the plurality of drive pinions, a second input member drivingly engaged with the plurality of drive pinions, a first array of spherical adjusters frictionally engaged with the first input member, each of the spherical adjusters configured to be tiltable and rotatable with respect to the drive member, a second array of spherical adjusters frictionally engaged with the second input member, each of the spherical adjusters configured to be tiltable and rotatable with respect to the drive member, a first output frictionally engaged with a surface of the first array of spherical adjusters to transmit torque from the drive member to the first output, and a second output frictionally engaged with a surface of the second array of spherical adjusters to transmit torque from the drive member to the second output. A torque distribution between the first output and the second output may be adjusted by tilting at least a portion of the plurality of spherical adjusters and the spherical adjusters facilitate a differential action between the first output and the second output.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
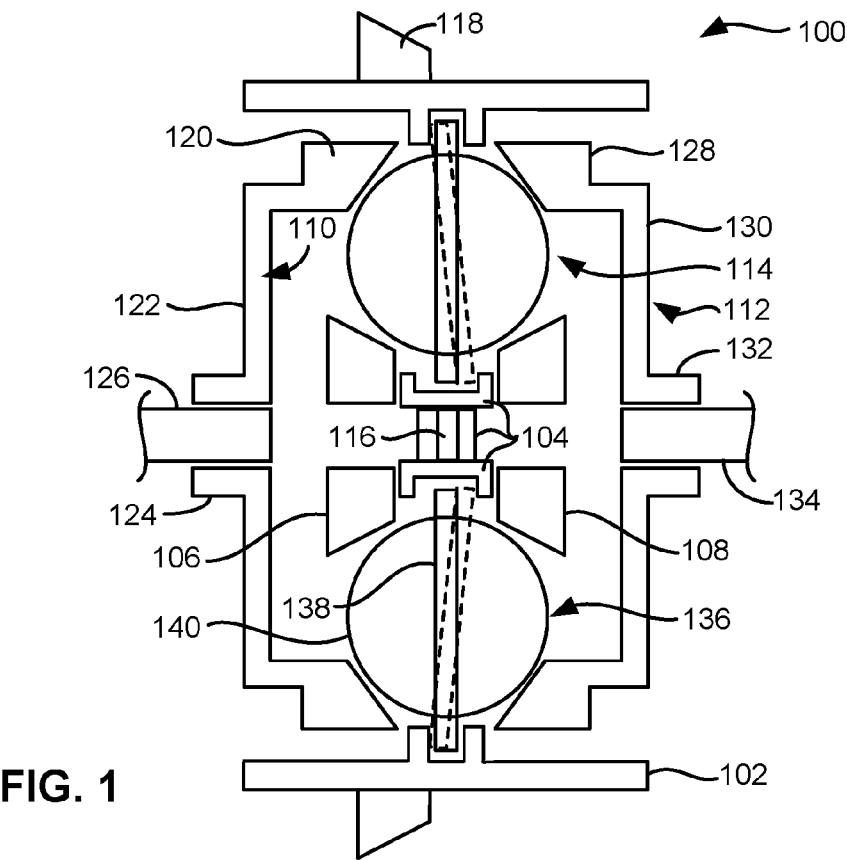
FIG. 1 is a cross-sectional view of a torque vectoring device according to an embodiment of the invention.

FIG. 1 illustrates a torque vectoring device 100. The torque vectoring device 100 comprises an outer cage 102, an inner cage 104, a first idling ring 106, a second idling ring 108, a first output ring 110, a second output ring 112, and a plurality of variator ball assemblies 114. The first idling ring 106, the second idling ring 106, the first output ring 110, and the second output ring 112 are rotatably disposed within the outer cage 102. A volume of the outer cage 102 between the first output ring 110 and the second output ring 112 may be filled with one of a traction fluid and an automatic transmission fluid. Each of the variator ball assemblies 114 is tiltably disposed between and drivingly engaged with the inner cage 104 and the outer cage 102. An actuator assembly 116 disposed within the outer cage 102 adjusts a position of the plurality of variator ball assemblies 114 between the inner cage 104 and the outer cage 102. The torque vectoring device 100 is typically rotatably disposed within a housing (not shown).

The outer cage 102 is a hollow member formed from a metal. The outer cage 102 comprises a plurality of components coupled together. The first idling ring 106, the second idling ring 108, the first output ring 110, and the second output ring 112 are rotatably disposed within the outer cage 102. A crown gear 118 is disposed about and coupled to an outer surface of the outer cage 102. Alternately, it is understood that the crown gear 118 may be integrally formed with the outer cage 102. An inner surface of the outer cage 102 is configured to facilitate driving engagement between the outer cage 102 and each of the variator ball assemblies 114 while permitting each of the variator ball assemblies 114 to be tilted with respect to the outer cage 102. Further, it is understood that the crown gear 118 may be replaced with another feature that facilitates driving engagement of the outer cage 102 with a power source, such as through a drive shaft or a drive gear.

The inner cage 104 is an annular member formed from a metal. An outer surface of the inner cage 104 is configured to facilitate driving engagement between the inner cage 104 and each of the variator ball assemblies 114 while permitting each of the variator ball assemblies 114 to be tilted with respect to the inner cage 104. The inner cage is 104 is coupled to the outer cage 102, and cooperate to drive the variator ball assemblies 114.

The first idling ring 106 is an annular member formed from a metal. The first idling ring 106 is rotatably disposed adjacent the inner cage 104 and is free to rotate with respect thereto. A portion of an outer surface of the first idling ring 106 is configured to contact a portion of each of the variator ball assemblies 114. The portion of each of the variator ball assemblies 114 is one of in frictional engagement with or in rolling contact with the first idling ring 106, depending on a position of the variator ball assemblies 114 or if the torque vectoring device 100 is performing a differential function.

The second idling ring 108 is an annular member formed from a metal. The second idling ring 108 is rotatably disposed adjacent the inner cage 104 and is free to rotate with respect thereto. A portion of an outer surface of the second idling ring 108 is configured to contact a portion of each of the variator ball assemblies 114. The portion of each of the variator ball assemblies 114 is one of in frictional engagement with or in rolling contact with the second idling ring 108, depending on a position of the variator ball assemblies 114 or if the torque vectoring device 100 is performing a differential function.

The first output ring 110 is an annular member formed from a metal. The first output ring 110 comprises an engagement end 120, a middle portion 122, and an output end 124. The first output ring 110 is rotatably disposed within the outer cage 102 and is free to rotate with respect thereto. The first output ring 110 is unitarily formed from a metal, however, it is understood that the first output ring 110 may comprise a plurality of components coupled together in any conventional manner.

The engagement end 120 defines an annular, conical surface that is configured to contact a portion of each of the variator ball assemblies 114. The engagement end 120 is one of in frictional engagement with or in rolling contact with the portion of each of the variator ball assemblies 114 contacting the engagement end 120, depending on a position of the variator ball assemblies 114 or if the torque vectoring device 100 is performing a differential function.

The middle portion 122 is a radially extending, substantially disk shaped portion of the first output ring 110; however, it is understood that the middle portion 122 may have other shapes. The output end 124 is an axially extending, sleeve shaped portion of the first output ring 110; however, it is understood that the output end 124 may have other shapes. An inner surface of the output end 124 defines a plurality of drive splines thereon, which facilitate driving engagement between the first output ring 110 and a first output shaft 126. Alternately, it is understood that the output end 124 may be configured with other features that facilitate driving engagement with the first output shaft 126.

The second output ring 112 is an annular member formed from a metal. The second output ring 112 comprises an engagement end 128, a middle portion 130, and an output end 132. The second output ring 112 is rotatably disposed within the outer cage 102 and is free to rotate with respect thereto. The second output ring 112 is unitarily formed from a metal, however, it is understood that the second output ring 112 may comprise a plurality of components coupled together in any conventional manner.

The engagement end 128 defines an annular, conical surface that is configured to contact a portion of each of the variator ball assemblies 114. The engagement end 128 is one of in frictional engagement with or in rolling contact with the portion of each of the variator ball assemblies 114 contacting the engagement end 128, depending on a position of the variator ball assemblies 114 or if the torque vectoring device 100 is performing a differential function.

The middle portion 130 is a radially extending, substantially disk shaped portion of the second output ring 112; however, it is understood that the middle portion 130 may have other shapes. The output end 132 is an axially extending, sleeve shaped portion of the second output ring 112; however, it is understood that the output end 132 may have other shapes. An inner surface of the output end 132 defines a plurality of drive splines thereon, which facilitate driving engagement between the second output ring 112 and a second output shaft 134. Alternately, it is understood that the output end 132 may be configured with other features that facilitate driving engagement with the second output shaft 134.

Each of the variator ball assemblies 114 includes at least a variator ball 136 and a variator axis 138, which are formed from a hardened metal. An outer surface 140 of each of the variator balls 136 is in contact with the engagement end 120, 128 of the output rings 110, 112. The variator axis 138 is disposed through and coupled to the variator ball 136. The variator axis 138 is rotatably and tiltably coupled to the outer cage 102 and the inner cage 104. Alternately, the variator ball 136 may be rotatably coupled to the variator axis 138 and the variator axis 138 may be tiltably coupled to the outer cage 102 and the inner cage 104. The torque vectoring device 100 includes at least three of the variator ball assemblies 114; however it is understood that the torque vectoring device 100 may include more than three of the variator ball assemblies 114.

The actuator assembly 116 disposed within the outer cage 102 adjusts a position of the plurality of variator ball assemblies 114 between the inner cage 104 and the outer cage 102. The plurality of variator ball assemblies 114 are simultaneously and similarly moved by the actuator assembly 116. As a non-limiting example, the actuator assembly 116 may be mechanically actuated by a member (not shown) disposed through a central perforation formed in one of the first output ring 110 and the second output ring 112. Alternately, it is understood that the actuator assembly 116 may be hydraulically, electrically, or pneumatically actuated and that the actuator assembly 116 may be disposed outside of the outer cage 102.

In use, the torque vectoring device 100 facilitates a transfer of torque from the outer cage 102 to the first output shaft 126 and the second output shaft 134 while facilitating the differential function between the first output shaft 126 and the second output shaft 134.

The first output ring 110 and the second output ring 112 are driven by the outer cage 102 through the frictional engagement between the engagement ends 120, 128 and the outer surface 140 of the variator balls 136. When the first output ring 110 and the second output ring 112 are rotating at substantially the same speed, each of the variator balls 136 does not rotate about its corresponding variator axis 138, and thus the outer cage 102, the inner cage 104, the variator ball assemblies 114, the first output ring 110, and the second output ring 112 rotate substantially simultaneously.

The differential function of the torque vectoring device 100 occurs in response to different rates of rotation between the first output ring 110 and the second output ring 112. When the first output ring 110 and the second output ring 112 rotate at different rates, the variator balls 136 rotate about the variator axis 138, rolling against the first output ring 110 and the second output ring 112. The differential function occurs even when the variator ball assemblies 114 are placed in a tilted position. As a non-limiting example, when a wheel (not shown) coupled to the first output shaft 126 is turning at a slower rate than a wheel (not shown) coupled to the second output shaft 126, such as when a vehicle the torque vectoring device 100 is incorporated in is driving through a turn, each of the variator balls 136 will start rotating around the variator axis 138 and the remaining wheel will adjust in speed proportionally.

A rotational speed of each of the variator balls 136 is typically a low amount. When the differential function is not occurring, the first output ring 110 and the second output ring 112 turn at the same speed, and the rotational speed of each of the variator balls 136 will be substantially equal to zero. The rotational speed of the variator balls 136 will be greater than zero when the first output ring 110 and the second output ring 112 are rotating at different speeds.

A ratio of torque applied to the first output shaft 126 and the second output shaft 134 may be adjusted by tilting the plurality of variator ball assemblies 114 using the actuator assembly 116. The ratio of torque is dependent on a ratio of the distances between the variator axes 138 of the variator balls 136 and a contact point of the first output ring 110 and the second output ring 112 with the outer surface 140 of the variator balls 136. Accordingly, to adjust the ratio of torque from an equal division, the variator balls 136 are tilted on the variator axes 138 by the actuator assembly 116. The actuator assembly 116 is typically controlled automatically by a controller (not shown) based on an input from a plurality of sensors (not shown). However, it is understood that the actuator assembly 116 may be controlled manually by an operator of the vehicle the torque vectoring device 100 is incorporated in.

Figure 2:
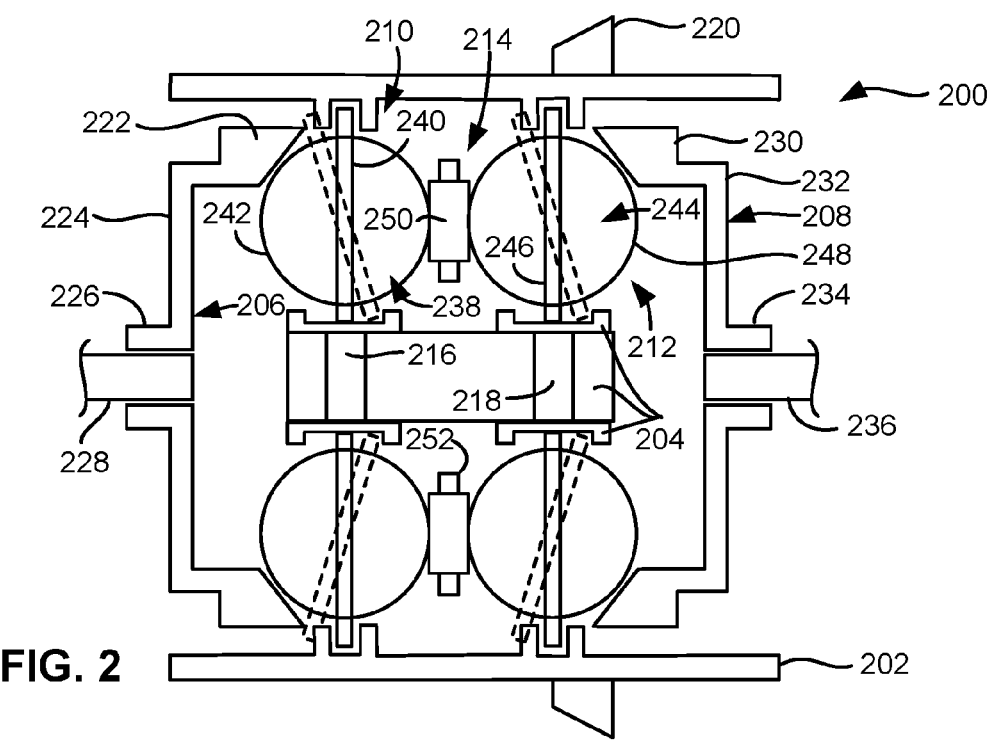
FIG. 2 is a cross-sectional view of a torque vectoring device according to another embodiment of the invention.

FIG. 2 illustrates a torque vectoring device 200. The torque vectoring device 200 comprises an outer cage 202, an inner cage 204, a first output ring 206, a second output ring 208, a first plurality of variator ball assemblies 210, a second plurality of variator ball assemblies 212, and a roller assembly 214. The first output ring 206 and the second output ring 208, and the roller assembly 214 are rotatably disposed within the outer cage 202. A volume of the outer cage 202 between the first output ring 206 and the second output ring 208 may be filled with one of a traction fluid and an automatic transmission fluid. Each of the variator ball assemblies 210, 212 is tiltably disposed between and drivingly engaged with the inner cage 204 and the outer cage 202. A first actuator assembly 216 and a second actuator assembly 218 disposed within the outer cage 202 respectively adjusts a position of the plurality of variator ball assemblies 210, 212, between the inner cage 204 and the outer cage 202. The torque vectoring device 200 is typically rotatably disposed within a housing (not shown).

The outer cage 202 is a hollow member formed from a metal. The outer cage 202 comprises a plurality of components coupled together. The first output ring 206 and the second output ring 208 are rotatably disposed within the outer cage 202. A crown gear 220 is disposed about and coupled to an outer surface of the outer cage 202. Alternately, it is understood that the crown gear 220 may be integrally formed with the outer cage 202. An inner surface of the outer cage 202 is configured to facilitate driving engagement between the outer cage 202 and each of the variator ball assemblies 210, 212 while permitting each of the variator ball assemblies 210, 212 to be tilted with respect to the outer cage 202. Further, it is understood that the crown gear 220 may be replaced with another feature that facilitates driving engagement of the outer cage 202 with a power source, such as through a drive shaft or a drive gear.

The inner cage 204 is an annular member formed from a metal. An outer surface of the inner cage 204 is configured to facilitate driving engagement between the inner cage 204 and each of the variator ball assemblies 210, 212 while permitting each of the variator ball assemblies 210, 212 to be tilted with respect to the inner cage 204. The inner cage is 204 is coupled to the outer cage 202, and cooperate to drive the variator ball assemblies 210, 212.

The first output ring 206 is an annular member formed from a metal. The first output ring 206 comprises an engagement end 222, a middle portion 224, and an output end 226. The first output ring 206 is rotatably disposed within the outer cage 202 and is free to rotate with respect thereto. The first output ring 206 is unitarily formed from a metal, however, it is understood that the first output ring 206 may comprise a plurality of components coupled together in any conventional manner.

The engagement end 222 defines an annular, conical surface that is configured to contact a portion of each of the first variator ball assemblies 210. The engagement end 222 is one of in frictional engagement with or in rolling contact with the portion of each of the first variator ball assemblies 210 contacting the engagement end 222, depending on a position of the first variator ball assemblies 210 or if the torque vectoring device 200 is performing a differential function.

The middle portion 224 is a radially extending, substantially disk shaped portion of the first output ring 206; however, it is understood that the middle portion 224 may have other shapes. The output end 226 is an axially extending, sleeve shaped portion of the first output ring 206; however, it is understood that the output end 226 may have other shapes. An inner surface of the output end 226 defines a plurality of drive splines thereon, which facilitate driving engagement between the first output ring 206 and a first output shaft 228. Alternately, it is understood that the output end 226 may be configured with other features that facilitate driving engagement with the first output shaft 228.

The second output ring 208 is an annular member formed from a metal. The second output ring 208 comprises an engagement end 230, a middle portion 232, and an output end 234. The second output ring 208 is rotatably disposed within the outer cage 202 and is free to rotate with respect thereto. The second output ring 208 is unitarily formed from a metal, however, it is understood that the second output ring 208 may comprise a plurality of components coupled together in any conventional manner.

The engagement end 230 defines an annular, conical surface that is configured to contact a portion of each of the second variator ball assemblies 212. The engagement end 230 is one of in frictional engagement with or in rolling contact with the portion of each of the second variator ball assemblies 212 contacting the engagement end 230, depending on a position of the second variator ball assemblies 212 or if the torque vectoring device 200 is performing a differential function.

The middle portion 232 is a radially extending, substantially disk shaped portion of the second output ring 208; however, it is understood that the middle portion 232 may have other shapes. The output end 234 is an axially extending, sleeve shaped portion of the second output ring 208; however, it is understood that the output end 234 may have other shapes. An inner surface of the output end 234 defines a plurality of drive splines thereon, which facilitate driving engagement between the second output ring 208 and a second output shaft 236. Alternately, it is understood that the output end 234 may be configured with other features that facilitate driving engagement with the second output shaft 236.

Each of the first variator ball assemblies 210 includes at least a first variator ball 238 and a first variator axis 240, which are formed from a hardened metal. An outer surface 242 of each of the first variator balls 238 is in contact with the engagement end 222 of the first output ring 206. The first variator axis 240 is disposed through and coupled to the first variator ball 238. The first variator axis 240 is rotatably and tiltably coupled to the outer cage 202 and the inner cage 204. Alternately, the first variator ball 238 may be rotatably coupled to the first variator axis 240 and the first variator axis 240 may be tiltably coupled to the outer cage 202 and the inner cage 204. The torque vectoring device 200 includes at least three of the first variator ball assemblies 210; however it is understood that the torque vectoring device 200 may include more than three of the first variator ball assemblies 210.

Each of the second variator ball assemblies 212 includes at least a second variator ball 244 and a second variator axis 246, which are formed from a hardened metal. An outer surface 248 of each of the second variator balls 244 is in contact with the engagement end 230 of the second output ring 208. The second variator axis 246 is disposed through and coupled to the second variator ball 244. The second variator axis 246 is rotatably and tiltably coupled to the outer cage 202 and the inner cage 204. Alternately, the second variator ball 244 may be rotatably coupled to the second variator axis 246 and the second variator axis 246 may be tiltably coupled to the outer cage 202 and the inner cage 204. The torque vectoring device 200 includes at least three of the second variator ball assemblies 212; however it is understood that the torque vectoring device 200 may include more than three of the second variator ball assemblies 212.

The roller assembly 214 is disposed between and in contact with the variator ball assemblies 210, 212. The roller assembly 214 comprises a plurality of rollers 250 rotatably disposed in a cage 252. A quantity of the rollers 250 corresponds to a number of variator balls 238, 244 in either of the variator ball assemblies 210, 212. Each of the rollers 250 are formed from a metal and are cylindrical in shape. The cage 252 rotatably holds the rollers 250 in an annular array. The rollers 250 are one of in frictional engagement with or in rolling contact with the outer surface 242, 248 of each of the variator balls 238, 244 of each of the variator ball assemblies 210, 212.

The first actuator assembly 216 disposed within the outer cage 202 adjusts a position of the plurality of first variator ball assemblies 210 between the inner cage 204 and the outer cage 202. The plurality of first variator ball assemblies 210 are simultaneously and similarly moved by the first actuator assembly 216. As a non-limiting example, the first actuator assembly 216 may be mechanically actuated by a member (not shown) disposed through a central perforation formed in one of the first output ring 206 and the second output ring 208. Alternately, it is understood that the first actuator assembly 216 may be hydraulically, electrically, or pneumatically actuated and that the first actuator assembly 216 may be disposed outside of the outer cage 202.

The second actuator assembly 218 disposed within the outer cage 202 adjusts a position of the plurality of second variator ball assemblies 212 between the inner cage 204 and the outer cage 202. The plurality of second variator ball assemblies 212 are simultaneously and similarly moved by the second actuator assembly 218. As a non-limiting example, the second actuator assembly 218 may be mechanically actuated by a member (not shown) disposed through a central perforation formed in one of the first output ring 206 and the second output ring 208. Alternately, it is understood that the second actuator assembly 218 may be hydraulically, electrically, or pneumatically actuated and that the second actuator assembly 218 may be disposed outside of the outer cage 202.

The first output ring 206 and the second output ring 208 are in frictional engagement with the outer cage 202 through the first variator ball assemblies 210 and the second variator ball assemblies 212. The roller assembly 214 ensures the first output ring 206 and the second output ring 208 may rotate with respect to one another when the differential function is needed.

To perform a torque vectoring function, the first actuator assembly 216 and the second actuator assembly 218 cause the variator axis 240 of each of the first variator ball assemblies 210 and the variator axis 246 of each of the second variator ball assemblies 212 to change by an equal amount in the same direction. Such a change of the variator axes 240, 246 causes a torque split between the first output ring 206 and the second output ring 208 to be adjusted.

To perform a transmission function, the first actuator assembly 216 and the second actuator assembly 218 cause the variator axis 240 of each of the first variator ball assemblies 210 and the variator axis 246 of each of the second variator ball assemblies 212 to change by an equal amount in opposing directions. Such a change of the variator axes 240, 246 of each of the first variator ball assemblies 210 and the second variator ball assemblies 212 causes a gear ratio of the first output ring 206 and the second output ring 208 to be adjusted with respect to the outer cage 202.

The torque vectoring device 200 may also be placed in a hybrid mode, where the transmission function and the torque vectoring function are performed simultaneously. To place the torque vectoring device 200 in the hybrid mode, the first actuator assembly 216 and the second actuator assembly 218 cause the variator axes 240, 246 of each of the first variator ball assemblies 210 and the second variator ball assemblies 212 to change by an unequal amount in either the same direction or in opposing directions. Such a change of the variator axes 240, 246 of each of the first variator ball assemblies 210 and the second variator ball assemblies 212 causes a gear ratio of the first output ring 206 and the second output ring 208 to be adjusted with respect to the outer cage 202 and a torque split between the first output ring 206 and the second output ring 208 to be adjusted.

Figure 3:
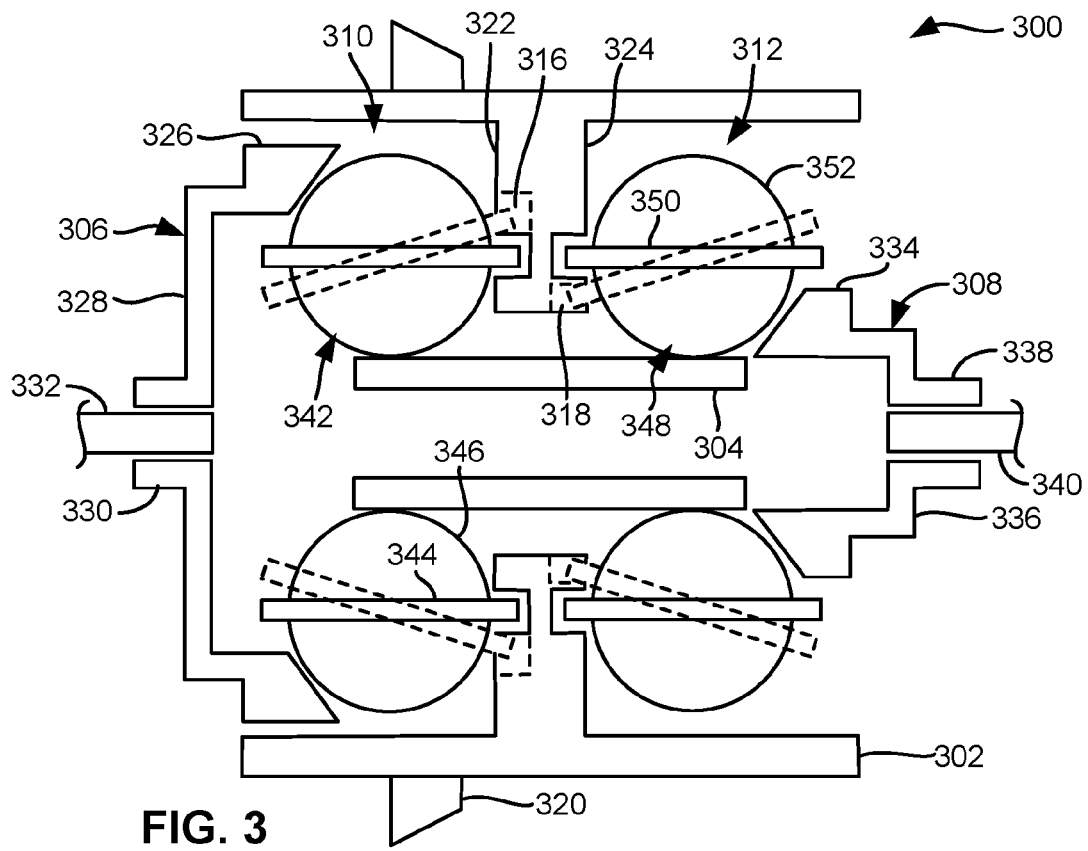
FIG. 3 is a cross-sectional view of a torque vectoring device according to another embodiment of the invention.

FIG. 3 illustrates a torque vectoring device 300. The torque vectoring device 300 comprises a drive member 302, a central roller 304, a first output ring 306, a second output ring 308, a first plurality of variator ball assemblies 310, a second plurality of variator ball assemblies 312. The drive member 302, the central roller 304, the first output ring 306, and the second output ring 308 are rotatably disposed within a housing (not shown). A volume of the housing between the first output ring 306 and the second output ring 308 may be filled with one of a traction fluid and an automatic transmission fluid. Each of the variator ball assemblies 310, 312 is tiltably disposed on and drivingly engaged with the drive member 302. A first actuator assembly 316 and a second actuator assembly 318 disposed adjacent the drive member 302 respectively adjusts a position of the plurality of variator ball assemblies 310, 312.

The drive member 302 is an annular member formed from a metal. The first plurality of variator ball assemblies 310 and the second plurality of variator ball assemblies 312 are disposed on opposite side of the drive member 302. A crown gear 320 is disposed about and coupled to an outer surface of the drive member 302. Alternately, it is understood that the crown gear 320 may be integrally formed with the drive member 302. A first drive surface 322 of the drive member 302 is configured to facilitate driving engagement between the drive member 302 and the first variator ball assemblies 310 while permitting the first variator ball assemblies 310 to be tilted with respect to the drive member 302. A second drive surface 324 of the drive member 302 is configured to facilitate driving engagement between the drive member 302 and the second variator ball assemblies 312 while permitting the second variator ball assemblies 312 to be tilted with respect to the drive member 302. Further, it is understood that the crown gear 320 may be replaced with another feature that facilitates driving engagement of the drive member 302 with a power source, such as through a drive shaft or a drive gear.

The central roller 304 is an annular member formed from a metal. An outer surface of the central roller 304 is configured to contact each of the variator ball assemblies 310, 312 while permitting each of the variator ball assemblies 310, 312 to be tilted with respect to the central roller 304. The central roller 304 is in frictional engagement with the variator ball assemblies 310, 312 by the drive member 302.

The first output ring 306 is an annular member formed from a metal. The first output ring 306 comprises an engagement end 326, a middle portion 328, and an output end 330. The first output ring 306 is rotatably disposed within the housing and is free to rotate with respect thereto. The first output ring 306 is unitarily formed from a metal, however, it is understood that the first output ring 306 may comprise a plurality of components coupled together in any conventional manner.

The engagement end 326 defines an annular, conical surface that is configured to contact a portion of each of the first variator ball assemblies 310. The engagement end 326 is one of in frictional engagement with or in rolling contact with the portion of each of the first variator ball assemblies 310 contacting the engagement end 326, depending on a position of the first variator ball assemblies 310 or if the torque vectoring device 300 is performing a differential function.

The middle portion 328 is a radially extending, substantially disk shaped portion of the first output ring 306; however, it is understood that the middle portion 328 may have other shapes. The output end 330 is an axially extending, sleeve shaped portion of the first output ring 306; however, it is understood that the output end 330 may have other shapes. An inner surface of the output end 330 defines a plurality of drive splines thereon, which facilitate driving engagement between the first output ring 306 and a first output shaft 332. Alternately, it is understood that the output end 330 may be configured with other features that facilitate driving engagement with the first output shaft 332.

The second output ring 308 is an annular member formed from a metal. The second output ring 308 comprises an engagement end 334, a middle portion 336, and an output end 338. The second output ring 308 is rotatably disposed within the housing and is free to rotate with respect thereto. The second output ring 308 is unitarily formed from a metal, however, it is understood that the second output ring 308 may comprise a plurality of components coupled together in any conventional manner. As shown in FIG. 3, the second output ring 308 has a diameter less than a diameter of the first output ring 306 and the second output ring 308 contacts the variator ball assemblies 312 radially inwardly where the first output ring 306 contacts the variator ball assemblies 310, with respect to the variator axes 344, 350.

The engagement end 334 defines an annular, conical surface that is configured to contact a portion of each of the second variator ball assemblies 312. As shown in FIG. 3, the engagement end 334 of the second output ring 308 is configured to have an orientation opposite an orientation of the engagement end 326 of the first output ring 306. The engagement end 334 is one of in frictional engagement with or in rolling contact with the portion of each of the second variator ball assemblies 312 contacting the engagement end 334, depending on a position of the second variator ball assemblies 312 or if the torque vectoring device 300 is performing a differential function.

The middle portion 336 is a radially extending, substantially disk shaped portion of the second output ring 308; however, it is understood that the middle portion 336 may have other shapes. The output end 338 is an axially extending, sleeve shaped portion of the second output ring 308; however, it is understood that the output end 338 may have other shapes. An inner surface of the output end 338 defines a plurality of drive splines thereon, which facilitate driving engagement between the second output ring 308 and a second output shaft 340. Alternately, it is understood that the output end 338 may be configured with other features that facilitate driving engagement with the second output shaft 340.

Each of the first variator ball assemblies 310 includes at least a first variator ball 342 and a first variator axis 344, which are formed from a hardened metal. An outer surface 346 of each of the first variator balls 342 is in contact with the engagement end 326 of the first output ring 306. The first variator axis 344 is disposed through and coupled to the first variator ball 342. The first variator axis 344 is rotatably and tiltably coupled to the drive member 302, adjacent the first drive surface 322. Alternately, the first variator ball 342 may be rotatably coupled to the first variator axis 344 and the first variator axis 344 may be tiltably coupled to the drive member 302. The torque vectoring device 300 includes at least three of the first variator ball assemblies 310; however it is understood that the torque vectoring device 300 may include more than three of the first variator ball assemblies 310.

Each of the second variator ball assemblies 312 includes at least a second variator ball 348 and a second variator axis 350, which are formed from a hardened metal. An outer surface 352 of each of the second variator balls 348 is in contact with the engagement end 334 of the second output ring 308. The second variator axis 350 is disposed through and coupled to the second variator ball 348. The second variator axis 350 is rotatably and tiltably coupled to the drive member 302, adjacent the second drive surface 324. Alternately, the second variator ball 348 may be rotatably coupled to the second variator axis 350 and the second variator axis 350 may be tiltably coupled to the drive member 302. The torque vectoring device 300 includes at least three of the second variator ball assemblies 312; however it is understood that the torque vectoring device 300 may include more than three of the second variator ball assemblies 312.

The first actuator assembly 316 disposed within the housing adjusts a position of the plurality of first variator ball assemblies 310 with respect to the drive member 302. The plurality of first variator ball assemblies 310 are simultaneously and similarly moved by the first actuator assembly 316. As a non-limiting example, the first actuator assembly 316 may be mechanically actuated by a member (not shown) disposed through a central perforation formed in one of the first output ring 306 and the second output ring 308. Alternately, it is understood that the first actuator assembly 316 may be hydraulically, electrically, or pneumatically actuated.

The second actuator assembly 318 disposed within the housing adjusts a position of the plurality of second variator ball assemblies 312 with respect to the drive member 302. The plurality of second variator ball assemblies 312 are simultaneously and similarly moved by the second actuator assembly 318. As a non-limiting example, the second actuator assembly 318 may be mechanically actuated by a member (not shown) disposed through a central perforation formed in one of the first output ring 306 and the second output ring 308. Alternately, it is understood that the second actuator assembly 318 may be hydraulically, electrically, or pneumatically actuated.

The first output ring 306 and the second output ring 308 are in frictional engagement with the drive member 302 through the first variator ball assemblies 310 and the second variator ball assemblies 312. The central roller assembly 304 ensures the first output ring 306 and the second output ring 308 may rotate with respect to one another when the differential function is needed.

To perform a torque vectoring function, the first actuator assembly 316 and the second actuator assembly 318 cause the variator axis 344 of each of the first variator ball assemblies 310 and the variator axis 350 of each of the second variator ball assemblies 312 to change by an equal amount in opposing directions. Such a change of the variator axes 344, 350 causes a torque split between the first output ring 306 and the second output ring 308 to be adjusted.

To perform a transmission function, the first actuator assembly 316 and the second actuator assembly 318 cause the variator axis 344 of each of the first variator ball assemblies 310 and the variator axis 350 of each of the second variator ball assemblies 312 to change by an equal amount in the same direction. Such a change of the variator axes 344, 350 of each of the first variator ball assemblies 310 and the second variator ball assemblies 312 causes a gear ratio of the first output ring 306 and the second output ring 308 to be adjusted with respect to the drive member 302.

The torque vectoring device 300 may also be placed in a hybrid mode, where the transmission function and the torque vectoring function are performed simultaneously. To place the torque vectoring device 300 in the hybrid mode, the first actuator assembly 316 and the second actuator assembly 318 cause the variator axes 344, 350 of each of the first variator ball assemblies 310 and the second variator ball assemblies 312 to change by an unequal amount in either the same direction or in opposing directions. Such a change of the variator axes 344, 350 of each of the first variator ball assemblies 310 and the second variator ball assemblies 312 causes a gear ratio of the first output ring 306 and the second output ring 308 to be adjusted with respect to the drive member 302 and a torque split between the first output ring 306 and the second output ring 308 to be adjusted.

Figure 4:
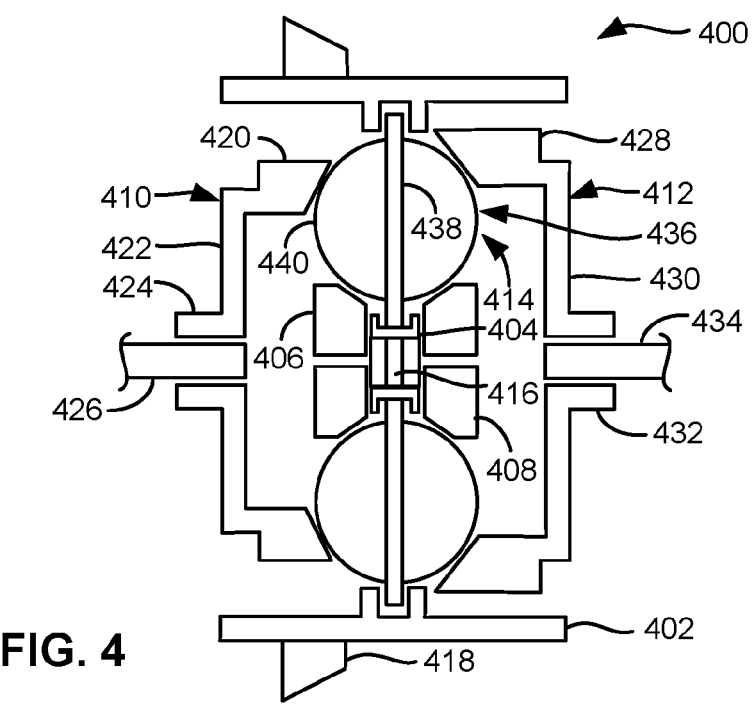
FIG. 4 is a cross-sectional view of a torque vectoring device according to another embodiment of the invention.

FIG. 4 illustrates a torque vectoring device 400. The torque vectoring device 400 comprises an outer cage 402, an inner cage 404, a first idling ring 406, a second idling ring 408, a first output ring 410, a second output ring 412, and a plurality of variator ball assemblies 414. The first idling ring 406, the second idling ring 408, the first output ring 410, and the second output ring 412 are rotatably disposed within the outer cage 402. A volume of the outer cage 402 between the first output ring 410 and the second output ring 412 may be filled with one of a traction fluid and an automatic transmission fluid. Each of the variator ball assemblies 414 is tiltably disposed between and drivingly engaged with the inner cage 404 and the outer cage 402. An actuator assembly 416 disposed within the outer cage 402 adjusts a position of the plurality of variator ball assemblies 414 between the inner cage 404 and the outer cage 402. The torque vectoring device 400 is typically rotatably disposed within a housing (not shown).

The outer cage 402 is a hollow member formed from a metal. The outer cage 402 comprises a plurality of components coupled together. The first idling ring 406, the second idling ring 408, the first output ring 410, and the second output ring 412 are rotatably disposed within the outer cage 402. A crown gear 418 is disposed about and coupled to an outer surface of the outer cage 402. Alternately, it is understood that the crown gear 418 may be integrally formed with the outer cage 402. An inner surface of the outer cage 402 is configured to facilitate driving engagement between the outer cage 402 and each of the variator ball assemblies 414 while permitting each of the variator ball assemblies 414 to be tilted with respect to the outer cage 402. Further, it is understood that the crown gear 418 may be replaced with another feature that facilitates driving engagement of the outer cage 402 with a power source, such as through a drive shaft or a drive gear.

The inner cage 404 is an annular member formed from a metal. An outer surface of the inner cage 404 is configured to facilitate driving engagement between the inner cage 404 and each of the variator ball assemblies 414 while permitting each of the variator ball assemblies 414 to be tilted with respect to the inner cage 404. The inner cage is 404 is coupled to the outer cage 402, and cooperate to drive the variator ball assemblies 414.

The first idling ring 406 is an annular member formed from a metal. The first idling ring 406 is rotatably disposed adjacent the inner cage 404 and is free to rotate with respect thereto. A portion of an outer surface of the first idling ring 406 is configured to contact a portion of each of the variator ball assemblies 414. The portion of each of the variator ball assemblies 414 is one of in frictional engagement with or in rolling contact with the first idling ring 406, depending on a position of the variator ball assemblies 414 or if the torque vectoring device 400 is performing a differential function.

The second idling ring 408 is an annular member formed from a metal. The second idling ring 408 is rotatably disposed adjacent the inner cage 404 and is free to rotate with respect thereto. A portion of an outer surface of the second idling ring 408 is configured to contact a portion of each of the variator ball assemblies 414. The portion of each of the variator ball assemblies 414 is one of in frictional engagement with or in rolling contact with the second idling ring 408, depending on a position of the variator ball assemblies 414 or if the torque vectoring device 400 is performing a differential function.

The first output ring 410 is an annular member formed from a metal. The first output ring 410 comprises an engagement end 420, a middle portion 422, and an output end 424. The first output ring 410 is rotatably disposed within the outer cage 402 and is free to rotate with respect thereto. The first output ring 410 is unitarily formed from a metal, however, it is understood that the first output ring 410 may comprise a plurality of components coupled together in any conventional manner. As shown in FIG. 4, a diameter of the first output ring 410 is less than a diameter of the second output ring 412; however, it is understood that the diameter of the second output ring 412 may be less than the diameter of the first output ring 410. As a result of a difference in diameter between the first output ring 410 and the second output ring 412, the first output ring 410 and the second output ring 412 respectively contact the variator ball assemblies 414 at different radial distances.

The engagement end 420 defines an annular, conical surface that is configured to contact a portion of each of the variator ball assemblies 414. The engagement end 420 is one of in frictional engagement with or in rolling contact with the portion of each of the variator ball assemblies 414 contacting the engagement end 420, depending on a position of the variator ball assemblies 414 or if the torque vectoring device 400 is performing a differential function.

The middle portion 422 is a radially extending, substantially disk shaped portion of the first output ring 410; however, it is understood that the middle portion 422 may have other shapes. The output end 424 is an axially extending, sleeve shaped portion of the first output ring 410; however, it is understood that the output end 424 may have other shapes. An inner surface of the output end 424 defines a plurality of drive splines thereon, which facilitate driving engagement between the first output ring 410 and a first output shaft 426. Alternately, it is understood that the output end 424 may be configured with other features that facilitate driving engagement with the first output shaft 426.

The second output ring 412 is an annular member formed from a metal. The second output ring 412 comprises an engagement end 428, a middle portion 430, and an output end 432. The second output ring 412 is rotatably disposed within the outer cage 402 and is free to rotate with respect thereto. The second output ring 412 is unitarily formed from a metal, however, it is understood that the second output ring 412 may comprise a plurality of components coupled together in any conventional manner.

The engagement end 428 defines an annular, conical surface that is configured to contact a portion of each of the variator ball assemblies 414. The engagement end 428 is one of in frictional engagement with or in rolling contact with the portion of each of the variator ball assemblies 414 contacting the engagement end 428, depending on a position of the variator ball assemblies 414 or if the torque vectoring device 400 is performing a differential function.

The middle portion 430 is a radially extending, substantially disk shaped portion of the second output ring 412; however, it is understood that the middle portion 430 may have other shapes. The output end 432 is an axially extending, sleeve shaped portion of the second output ring 412; however, it is understood that the output end 432 may have other shapes. An inner surface of the output end 432 defines a plurality of drive splines thereon, which facilitate driving engagement between the second output ring 412 and a second output shaft 434. Alternately, it is understood that the output end 432 may be configured with other features that facilitate driving engagement with the second output shaft 434.

Each of the variator ball assemblies 414 includes at least a variator ball 436 and a variator axis 438, which are formed from a hardened metal. An outer surface 440 of each of the variator balls 436 is in contact with the engagement ends 420, 428 of the output rings 410, 412. The variator axis 438 is disposed through and coupled to the variator ball 436. The variator axis 438 is rotatably and tiltably coupled to the outer cage 402 and the inner cage 404. Alternately, the variator ball 436 may be rotatably coupled to the variator axis 438 and the variator axis 438 may be tiltably coupled to the outer cage 402 and the inner cage 404. The torque vectoring device 400 includes at least three of the variator ball assemblies 414; however it is understood that the torque vectoring device 400 may include more than three of the variator ball assemblies 414.

The actuator assembly 416 disposed within the outer cage 402 adjusts a position of the plurality of variator ball assemblies 414 between the inner cage 404 and the outer cage 402.

The plurality of variator ball assemblies 414 are simultaneously and similarly moved by the actuator assembly 416. As a non-limiting example, the actuator assembly 416 may be mechanically actuated by a member (not shown) disposed through a central perforation formed in one of the first output ring 410 and the second output ring 412. Alternately, it is understood that the actuator assembly 416 may be hydraulically, electrically, or pneumatically actuated and that the actuator assembly 416 may be disposed outside of the outer cage 402.

In use, the torque vectoring device 400 facilitates a transfer of torque from the outer cage 402 to the first output shaft 426 and the second output shaft 434 while facilitating the differential function between the first output shaft 426 and the second output shaft 434.

The first output ring 410 and the second output ring 412 are driven by the outer cage 402 through the frictional engagement between the engagement ends 420, 428 and the outer surface 440 of the variator balls 436. When the first output ring 410 and the second output ring 412 are rotating at substantially the same speed, each of the variator balls 436 does not rotate about its corresponding variator axis 438, and thus the outer cage 402, the inner cage 404, the variator ball assemblies 414, the first output ring 410, and the second output ring 412 rotate substantially simultaneously.

As a result of a difference in diameter between the first output ring 410 and the second output ring 412, a different amount of torque is applied to each of the first output ring 410 and the second output ring 412. It is understood that a shape of the first output ring 410 and the second output ring 412 may be configured to distribute torque in a predetermined, unequal manner when the variator ball assemblies 414 are placed in an untilted orientation.

As a non-limiting example, the torque vectoring device 400 may be employed in a four wheel drive vehicle to divide torque between a set of front wheels and a set of rear wheels. When the torque vectoring device 400 is used to divide torque between the set of front wheels and the set of rear wheels, the torque vectoring device 400 can be adapted to provide a predetermined, unequal torque ratio. Such a torque vectoring device 400 can be used when the equal division of the ratio of torque is not desired.

The differential function of the torque vectoring device 400 occurs in response to different rates of rotation between the first output ring 410 and the second output ring 412. When the first output ring 410 and the second output ring 412 rotate at different rates, the variator balls 436 rotate about the variator axis 438, rolling against the first output ring 410 and the second output ring 412. The differential function occurs even when the variator ball assemblies 414 are placed in a tilted position. As a non-limiting example, when an axle (not shown) drivingly engaged with the first output shaft 426 is turning at a faster rate than an axle (not shown) drivingly engaged with the second output shaft 434, such as when a vehicle the torque vectoring device 400 is incorporated in is traversing slick terrain, each of the variator balls 436 will start rotating around the variator axis 438 and the remaining axle will adjust in speed proportionally.

A rotational speed of each of the variator balls 436 is typically a low amount. When the differential function is not occurring, the first output ring 410 and the second output ring 412 turn at the same rate, and the rotational speed of each of the variator balls 436 will be substantially equal to zero. The rotational speed of the variator balls 436 will be greater than zero when the first output ring 410 and the second output ring 412 are rotating at different rates.

A ratio of torque applied to the first output shaft 426 and the second output shaft 434 may be adjusted by tilting the plurality of variator ball assemblies 414 using the actuator assembly 416. The ratio of torque is dependent on a ratio of the distances between the variator axes 438 of the variator balls 436 and a contact point of the first output ring 410 and the second output ring 412 with the outer surface 440 of the variator balls 436. Accordingly, to adjust the ratio of torque from an equal division, the variator balls 436 are tilted on the variator axes 438 by the actuator assembly 416. The actuator assembly 416 is typically controlled automatically by a controller (not shown) based on an input from a plurality of sensors (not shown). However, it is understood that the actuator assembly 416 may be controlled manually by an operator of the vehicle the torque vectoring device 400 is incorporated in.

Figure 5:
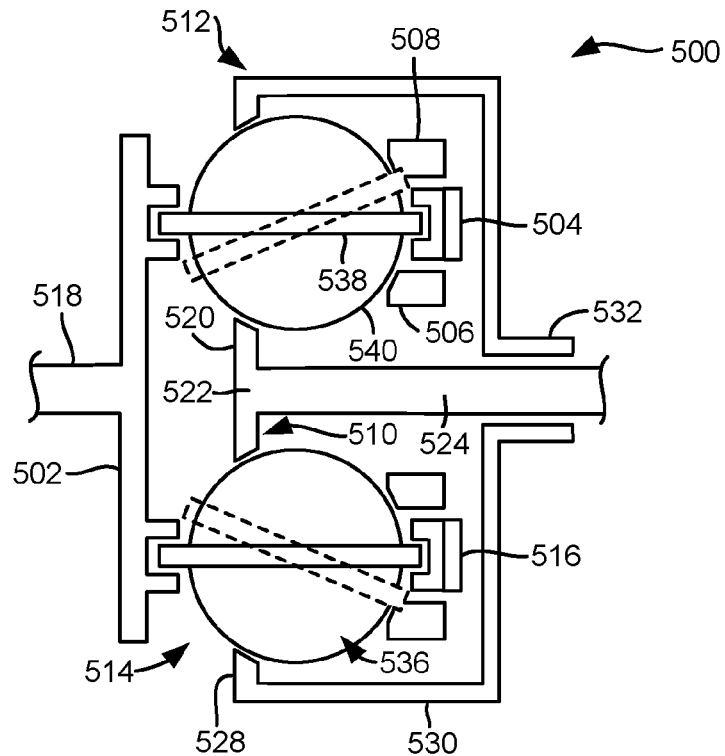
FIG. 5 is a cross-sectional view of a torque vectoring device according to another embodiment of the invention.

FIG. 5 illustrates a torque vectoring device 500. The torque vectoring device 500 comprises a drive member 502, an inner cage 504, an inner idling ring 506, an outer idling ring 508, an inner output ring 510, an outer output ring 512, and a plurality of variator ball assemblies 514. The inner idling ring 506, the outer idling ring 508, the inner output ring 510, and the outer output ring 512 are rotatably disposed within a housing (not shown). A volume of the housing between the drive member 502 and the outer output ring 512 may be filled with one of a traction fluid and an automatic transmission fluid. Each of the variator ball assemblies 514 is tiltably disposed between and drivingly engaged with the inner cage 504 and the drive member 502. An actuator assembly 516 adjusts a position of the plurality of variator ball assemblies 514 between the inner cage 504 and the drive member 502.

The drive member 502 is a substantially disk-shaped member formed from a metal. The drive member 502 may comprise a plurality of components coupled together or the drive member 502 may be of unitary construction. A drive shaft 518 is integrally formed with the drive member 502. The drive shaft 518 facilitates driving engagement of the drive member 502 with a power source. Alternately, it is understood that the drive shaft 518 may be formed separate from and coupled to the drive member 502 in any conventional manner. Further, it is understood that a drive gear may be integrally formed with or coupled to the drive member 502. An inner surface of the drive member 502 is configured to facilitate driving engagement between the drive member 502 and each of the variator ball assemblies 514 while permitting each of the variator ball assemblies 514 to be tilted with respect to the drive member 502.

The inner cage 504 is an annular member formed from a metal. An axial facing surface of the inner cage 504 is configured to facilitate driving engagement between the inner cage 504 and each of the variator ball assemblies 514 while permitting each of the variator ball assemblies 514 to be tilted with respect to the inner cage 504. The inner cage is 504 is coupled to the drive member 502, and cooperate to drive the variator ball assemblies 514.

The inner idling ring 506 is an annular member formed from a metal. The inner idling ring 506 is rotatably disposed radially inwardly from the inner cage 504 and is free to rotate with respect thereto. A portion of an axially facing surface of the inner idling ring 506 is configured to contact a portion of each of the variator ball assemblies 514. The portion of each of the variator ball assemblies 514 is one of in frictional engagement with or in rolling contact with the inner idling ring 506, depending on a position of the variator ball assemblies 514 or if the torque vectoring device 500 is performing a differential function.

The outer idling ring 508 is an annular member formed from a metal. The outer idling ring 508 is rotatably disposed radially outwardly from the inner cage 504 and is free to rotate with respect thereto. A portion of an axially facing surface of the outer idling ring 508 is configured to contact a portion of each of the variator ball assemblies 514. The portion of each of the variator ball assemblies 514 is one of in frictional engagement with or in rolling contact with the outer idling ring 508, depending on a position of the variator ball assemblies 514 or if the torque vectoring device 500 is performing a differential function.

The inner output ring 510 is an annular member. The inner output ring 510 comprises an engagement end 520, a hub portion 522, and an output shaft 524. The inner output ring 510 is rotatably disposed within the outer output ring 512 and is free to rotate with respect thereto. The inner output ring 510 is unitarily formed from a metal, however, it is understood that the inner output ring 510 may comprise a plurality of components coupled together in any conventional manner. As shown in FIG. 5, a diameter of the inner output ring 510 is less than a diameter of the outer output ring 512 and the inner output ring 510 contacts the variator ball assemblies 514 radially inwardly from the outer output ring 512, with respect to the variator axes 538.

The engagement end 520 defines an annular, conical surface that is configured to contact a portion of each of the variator ball assemblies 514. The engagement end 520 is one of in frictional engagement with or in rolling contact with the portion of each of the variator ball assemblies 514 contacting the engagement end 520, depending on a position of the variator ball assemblies 514 or if the torque vectoring device 500 is performing a differential function.

The hub portion 522 is a radially extending, substantially disk shaped portion of the inner output ring 510; however, it is understood that the hub portion 522 may have other shapes. The output shaft 524 is an axially extending, cylinder shaped portion of the inner output ring 510. The output shaft 524 may be drivingly coupled to another shaft (not shown) through a joint (not shown). Alternately, a portion of the output shaft 524 may define a plurality of splines to facilitate driving engagement therewith.

The outer output ring 512 is an annular member formed. The outer output ring 512 comprises an engagement end 528, a middle portion 530, and an output sleeve 532. The outer output ring 512 is rotatably disposed within the housing and is free to rotate with respect thereto. The outer output ring 512 is unitarily formed from a metal, however, it is understood that the outer output ring 512 may comprise a plurality of components coupled together in any conventional manner.

The engagement end 528 defines an annular, conical surface that is configured to contact a portion of each of the variator ball assemblies 514. The engagement end 528 is one of in frictional engagement with or in rolling contact with the portion of each of the variator ball assemblies 514 contacting the engagement end 528, depending on a position of the variator ball assemblies 514 or if the torque vectoring device 500 is performing a differential function.

The middle portion 530 is a hollow cylindrically shaped portion of the outer output ring 512; however, it is understood that the middle portion 530 may have other shapes. The output sleeve 532 is an axially extending, sleeve shaped portion of the outer output ring 512; however, it is understood that the output sleeve 532 may have other shapes. An outer surface of the output sleeve 532 may define a plurality of drive splines thereon, which facilitate driving engagement therewith. Alternately, it is understood that the output sleeve 532 may be configured with other features that facilitate driving engagement with the outer output ring 512.

Each of the variator ball assemblies 514 includes at least a variator ball 536 and a variator axis 538, which are formed from a hardened metal. An outer surface 540 of each of the variator balls 536 is in contact with the engagement ends 520, 528 of the output rings 510, 512. The variator axis 538 is disposed through and coupled to the variator ball 536. The variator axis 538 is rotatably and tiltably coupled to the drive member 502 and the inner cage 504. Alternately, the variator ball 536 may be rotatably coupled to the variator axis 538 and the variator axis 538 may be tiltably coupled to the drive member 502 and the inner cage 504. The torque vectoring device 500 includes at least three of the variator ball assemblies 514; however it is understood that the torque vectoring device 500 may include more than three of the variator ball assemblies 514.

The actuator assembly 516 disposed within the housing adjusts a position of the plurality of variator ball assemblies 514 between the inner cage 504 and the drive member 502. The plurality of variator ball assemblies 514 are simultaneously and similarly moved by the actuator assembly 516. As a non-limiting example, the actuator assembly 516 may be mechanically actuated by a member (not shown) disposed through a central perforation formed in one of the inner output ring 510 and the drive member 502. Alternately, it is understood that the actuator assembly 516 may be hydraulically, electrically, or pneumatically actuated and that the actuator assembly 516 may be disposed outside of the outer output ring 512.

In use, the torque vectoring device 500 facilitates a transfer of torque from the drive member 502 to the output shaft 524 and the output sleeve 532 while facilitating the differential function between the output shaft 524 and the output sleeve 532.

The inner output ring 510 and the outer output ring 512 are driven by the drive member 502 through the frictional engagement between the engagement ends 520, 528 and the outer surface 540 of the variator balls 536. When the inner output ring 510 and the outer output ring 512 are rotating at substantially the same speed, each of the variator balls 536 does not rotate about its corresponding variator axis 538, and thus the drive member 502, the inner cage 504, the variator ball assemblies 514, the inner output ring 510, and the outer output ring 512 rotate substantially simultaneously.

The differential function of the torque vectoring device 500 occurs in response to different rates of rotation between the inner output ring 510 and the outer output ring 512. When the inner output ring 510 and the outer output ring 512 rotate at different rates, the variator balls 536 rotate about the variator axis 538, rolling against the inner output ring 510 and the outer output ring 512. The differential function occurs even when the variator ball assemblies 514 are placed in a tilted position. As a non-limiting example, when an axle (not shown) drivingly engaged with the output shaft 524 is turning at a faster rate than an axle (not shown) drivingly engaged with the output sleeve 532, such as when a vehicle the torque vectoring device 500 is incorporated in is traversing slick terrain, each of the variator balls 536 will start rotating around the variator axis 538 and the remaining axle will adjust in speed proportionally.

A rotational speed of each of the variator balls 536 is typically a low amount. When the differential function is not occurring, the inner output ring 510 and the outer output ring 512 turn at the same rate, and the rotational speed of each of the variator balls 536 will be substantially equal to zero. The rotational speed of the variator balls 536 will be greater than zero when the inner output ring 510 and the outer output ring 512 are rotating at different rates.

A ratio of torque applied to the output shaft 526 and the output sleeve 532 may be adjusted by tilting the plurality of variator ball assemblies 514 using the actuator assembly 516. The ratio of torque is dependent on a ratio of the distances between the variator axes 538 of the variator balls 536 and a contact point of the inner output ring 510 and the outer output ring 512 with the outer surface 540 of the variator balls 536. Accordingly, to adjust the ratio of torque from an equal division, the variator balls 536 are tilted on the variator axes 538 by the actuator assembly 516. The actuator assembly 516 is typically controlled automatically by a controller (not shown) based on an input from a plurality of sensors (not shown). However, it is understood that the actuator assembly 516 may be controlled manually by an operator of the vehicle the torque vectoring device 500 is incorporated in.

Figure 6:
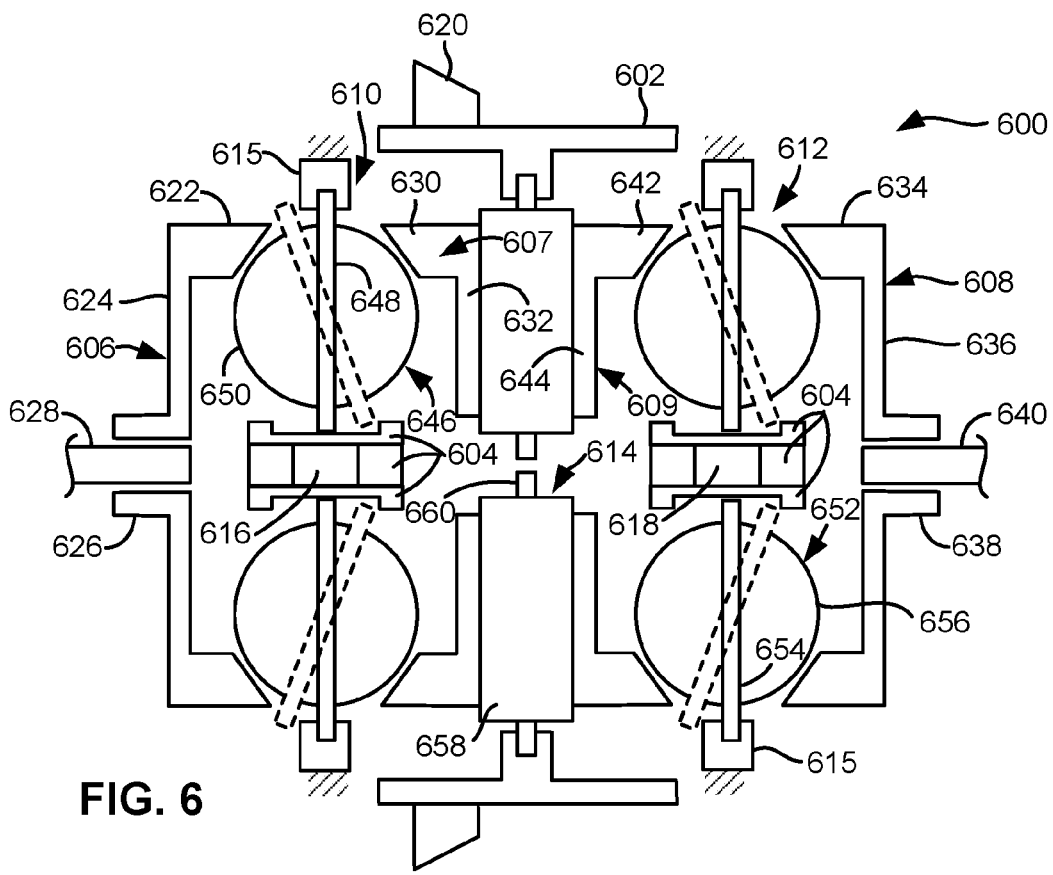
FIG. 6 is a cross-sectional view of a torque vectoring device according to another embodiment of the invention.

FIG. 6 illustrates a torque vectoring device 600. The torque vectoring device 600 comprises a drive member 602, an inner cage 604, a first output ring 606, a first input ring 607, a second output ring 608, a second input ring 609, a first plurality of variator ball assemblies 610, a second plurality of variator ball assemblies 612, and a roller assembly 614. The first output ring 606, the first input ring 607, the second output ring 608, the second input ring 609, and the roller assembly 614 are rotatably disposed within a housing 615. The inner cage 604, the first plurality of variator ball assemblies 610 and the second plurality of variator ball assemblies 612 are non-rotatably disposed within the housing 615. A volume between the first output ring 606 and the second output ring 608 may be filled with one of a traction fluid and an automatic transmission fluid. Each of the variator ball assemblies 610, 612 is tiltably disposed between the inner cage 604 and the housing 615. A first actuator assembly 616 and a second actuator assembly 618 disposed within the housing 615 respectively adjusts a position of the plurality of variator ball assemblies 610, 612, between the inner cage 604 and the housing 615.

The drive member 602 is an annular member formed from a metal. The drive member 602 is unitary in construction; however, it is understood that the drive member 602 may comprise a plurality of components coupled together. The roller assembly 614 is disposed within and drivingly engaged with the drive member 602. A crown gear 620 is disposed about and coupled to an outer surface of the drive member 602. Alternately, it is understood that the crown gear 620 may be integrally formed with the drive member 602. An inner surface of the drive member 602 is configured to facilitate driving engagement between the drive member 602 and the roller assembly 614. Further, it is understood that the crown gear 620 may be replaced with another feature that facilitates driving engagement of the drive member 602 with a power source, such as through a drive shaft or a drive gear.

The inner cage 604 is an annular member formed from a metal. An outer surface of the inner cage 604 is configured to be coupled to each of the variator ball assemblies 610, 612 while permitting each of the variator ball assemblies 610, 612 to be tilted with respect to the inner cage 604. The inner cage 604 is restrained from rotating within the housing 615, as the inner cage 606 is coupled to the housing 615, and cooperate to hold the variator ball assemblies 610, 612.

The first output ring 606 is an annular member formed from a metal. The first output ring 606 comprises an engagement end 622, a middle portion 624, and an output end 626. The first output ring 606 is rotatably disposed within the housing 615 and is free to rotate with respect thereto. The first output ring 606 is unitarily formed from a metal, however, it is understood that the first output ring 606 may comprise a plurality of components coupled together in any conventional manner.

The engagement end 622 defines an annular, conical surface that is configured to contact a portion of each of the first variator ball assemblies 610. The engagement end 622 is in rolling contact with the portion of each of the first variator ball assemblies 610 contacting the engagement end 622.

The middle portion 624 is a radially extending, substantially disk shaped portion of the first output ring 606; however, it is understood that the middle portion 624 may have other shapes. The output end 626 is an axially extending, sleeve shaped portion of the first output ring 606; however, it is understood that the output end 626 may have other shapes. An inner surface of the output end 626 defines a plurality of drive splines thereon, which facilitate driving engagement between the first output ring 606 and a first output shaft 628. Alternately, it is understood that the output end 626 may be configured with other features that facilitate driving engagement with the first output shaft 628.

The first input ring 607 is an annular member formed from a metal. The first input ring 607 comprises an engagement end 630 and a drive end 632. The first input ring 607 is rotatably disposed within the housing 615 and is free to rotate with respect thereto. The first input ring 607 is unitarily formed, however, it is understood that the first input ring 607 may comprise a plurality of components coupled together in any conventional manner.

The engagement end 630 defines an annular, conical surface that is configured to contact a portion of each of the first variator ball assemblies 610. The engagement end 630 is in rolling contact with the portion of each of the first variator ball assemblies 610 contacting the engagement end 630.

The drive end 632 is a radially extending, substantially disk shaped portion of the first input ring 607; however, it is understood that the drive end 632 may have other shapes. The drive end 632 is one of in frictional engagement with or in rolling contact with a portion of the roller assembly contacting the drive end 632, depending on if the torque vectoring device 600 is performing a differential function.

The second output ring 608 is an annular member formed from a metal. The second output ring 608 comprises an engagement end 634, a middle portion 636, and an output end 638. The second output ring 608 is rotatably disposed within the housing 615 and is free to rotate with respect thereto. The second output ring 608 is unitarily formed from a metal, however, it is understood that the second output ring 608 may comprise a plurality of components coupled together in any conventional manner.

The engagement end 634 defines an annular, conical surface that is configured to contact a portion of each of the second variator ball assemblies 612. The engagement end 634 is in rolling contact with the portion of each of the second variator ball assemblies 612 contacting the engagement end 634.

The middle portion 636 is a radially extending, substantially disk shaped portion of the second output ring 608; however, it is understood that the middle portion 636 may have other shapes. The output end 638 is an axially extending, sleeve shaped portion of the second output ring 608; however, it is understood that the output end 638 may have other shapes. An inner surface of the output end 638 defines a plurality of drive splines thereon, which facilitate driving engagement between the second output ring 608 and a second output shaft 640. Alternately, it is understood that the output end 638 may be configured with other features that facilitate driving engagement with the second output shaft 640.

The second input ring 609 is an annular member formed from a metal. The second input ring 609 comprises an engagement end 642 and a drive end 644. The second input ring 609 is rotatably disposed within the housing 615 and is free to rotate with respect thereto. The second input ring 609 is unitarily formed, however, it is understood that the second input ring 609 may comprise a plurality of components coupled together in any conventional manner.

The engagement end 642 defines an annular, conical surface that is configured to contact a portion of each of the second variator ball assemblies 612. The engagement end 642 is in rolling contact with the portion of each of the second variator ball assemblies 612 contacting the engagement end 642.

The drive end 644 is a radially extending, substantially disk shaped portion of the second input ring 609; however, it is understood that the drive end 644 may have other shapes. The drive end 644 is one of in frictional engagement with or in rolling contact with a portion of the roller assembly contacting the drive end 644, depending on if the torque vectoring device 600 is performing a differential function.

Each of the first variator ball assemblies 610 includes at least a first variator ball 646 and a first variator axis 648, which are formed from a hardened metal. An outer surface 650 of each of the first variator balls 646 is in contact with the engagement end 622 of the first output ring 606 and the engagement end 630 of the first input ring 607. The first variator axis 648 is disposed through and coupled to the first variator ball 646. The first variator axis 648 is rotatably and tiltably coupled to the housing 615 and the inner cage 604. Alternately, the first variator ball 646 may be rotatably coupled to the first variator axis 648 and the first variator axis 648 may be tiltably coupled to the housing 615 and the inner cage 604. The torque vectoring device 600 includes at least three of the first variator ball assemblies 610; however it is understood that the torque vectoring device 600 may include more than three of the first variator ball assemblies 610.

Each of the second variator ball assemblies 612 includes at least a second variator ball 652 and a second variator axis 654, which are formed from a hardened metal. An outer surface 656 of each of the second variator balls 652 is in contact with the engagement end 630 of the second output ring 608 and the engagement end 642 of the second input ring 609. The second variator axis 654 is disposed through and coupled to the second variator ball 652. The second variator axis 654 is rotatably and tiltably coupled to the housing 615 and the inner cage 604. Alternately, the second variator ball 652 may be rotatably coupled to the second variator axis 654 and the second variator axis 654 may be tiltably coupled to the housing 615 and the inner cage 604. The torque vectoring device 600 includes at least three of the second variator ball assemblies 612; however it is understood that the torque vectoring device 600 may include more than three of the second variator ball assemblies 612.

The roller assembly 614 is disposed between and in contact with the input rings 607, 609. The roller assembly 614 comprises a plurality of rollers 658 rotatably disposed on and drivingly engaged with an axis 660. Each of the rollers 658 are formed from a metal and are cylindrical in shape. The drive member 602 rotatably holds and drives the axes 660 in an annular array. The rollers 658 are one of in frictional engagement with or in rolling contact with the drive ends 632, 644 of each of the input rings 607, 609.

The first actuator assembly 616 disposed within the housing 615 adjusts a position of the plurality of first variator ball assemblies 610 between the inner cage 604 and the housing 615. The plurality of first variator ball assemblies 610 are simultaneously and similarly moved by the first actuator assembly 616. As a non-limiting example, the first actuator assembly 616 may be mechanically actuated by a member (not shown) disposed through a central perforation formed in at least one of the first output ring 606, the first input ring 607, the second output ring 608, and the second input ring 609. Alternately, it is understood that the first actuator assembly 616 may be hydraulically, electrically, or pneumatically actuated.

The second actuator assembly 618 disposed within the housing 615 adjusts a position of the plurality of second variator ball assemblies 612 between the inner cage 604 and the housing 615. The plurality of second variator ball assemblies 612 are simultaneously and similarly moved by the second actuator assembly 618. As a non-limiting example, the second actuator assembly 618 may be mechanically actuated by a member (not shown) disposed through a central perforation formed in at least one of the first output ring 606, the first input ring 607, the second output ring 608, and the second input ring 609. Alternately, it is understood that the second actuator assembly 618 may be hydraulically, electrically, or pneumatically actuated.

The first output ring 606 and the second output ring 608 are in driving engagement with the drive member 602 through the roller assembly 614, the first input ring 607, the second input ring 609, the first variator ball assemblies 610, and the second variator ball assemblies 612. The roller assembly 614 disposed between the first input ring 607 and the second input ring 609 frictionally drives the first input ring 607 and the second input ring 609, which drive the first variator ball assemblies 610 and the second variator ball assemblies 612. The roller assembly 614 ensures the first input ring 607 and the second input ring 609 may rotate with respect to one another when the differential function is needed.

To perform a torque vectoring function, the first actuator assembly 616 and the second actuator assembly 618 cause the variator axes 648, 654 of each of the first variator ball assemblies 610 and the second variator ball assemblies 612 to change by a predetermined or a calculated amount in the same direction. Such a change of the variator axes 648, 654 causes a torque split between the first output ring 606 and the second output ring 608 to be adjusted.

To perform a transmission function, the first actuator assembly 616 and the second actuator assembly 618 cause the variator axes 648, 654 of each of the first variator ball assemblies 610 and the second variator ball assemblies 612 to change by an equal amount in opposing directions. Such a change of the variator axes 648, 654 of each of the first variator ball assemblies 610 and the second variator ball assemblies 612 causes a gear ratio of the first output ring 606 and the second output ring 608 to be adjusted with respect to the drive member 602.

The torque vectoring device 600 may also be placed in a hybrid mode, where the transmission function and the torque vectoring function are performed simultaneously. To place the torque vectoring device 600 in the hybrid mode, the first actuator assembly 616 and the second actuator assembly 618 cause the variator axes 648, 654 of each of the first variator ball assemblies 610 and the second variator ball assemblies 612 to change by an unequal amount in either the same direction or in opposing directions. Such a change of the variator axes 648, 654 of each of the first variator ball assemblies 610 and the second variator ball assemblies 612 causes a gear ratio of the first output ring 606 and the second output ring 608 to be adjusted with respect to the drive member 602 and a torque split between the first output ring 606 and the second output ring 608 to be adjusted.

Figure 7:
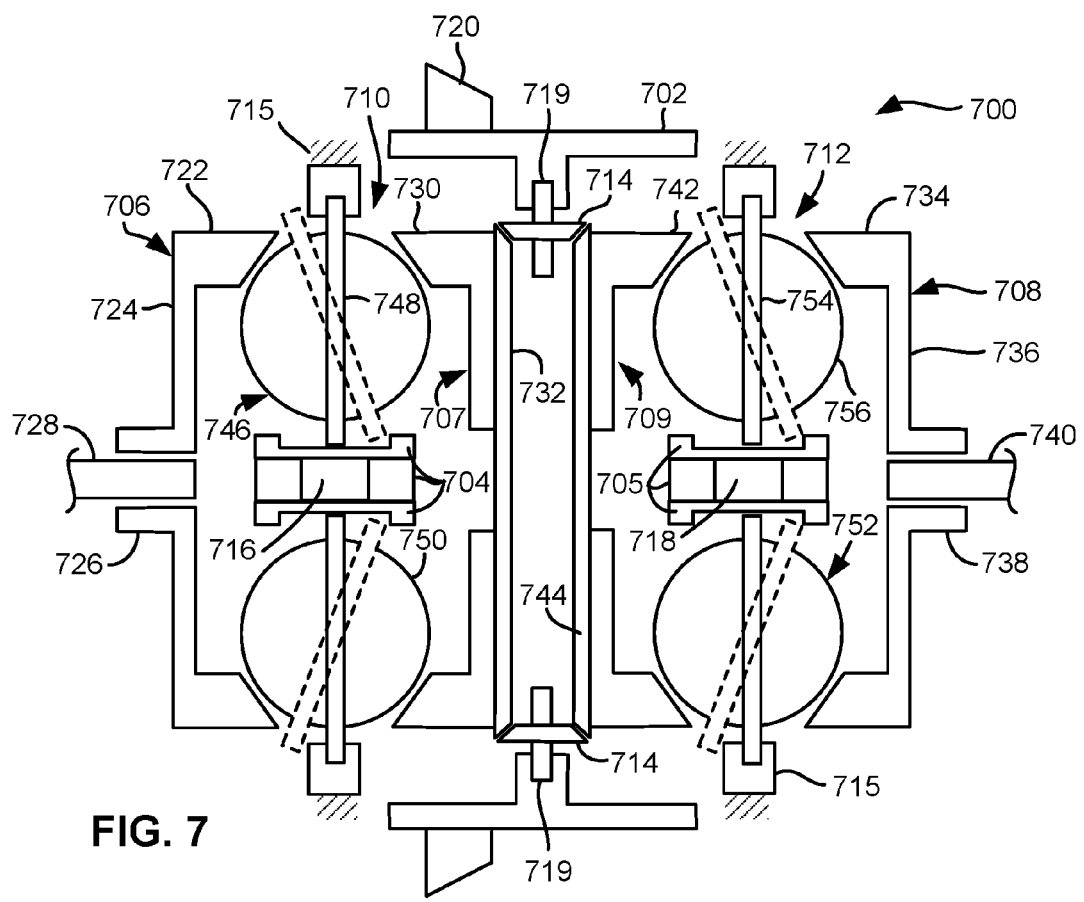
FIG. 7 is a cross-sectional view of a torque vectoring device according to another embodiment of the invention.

FIG. 7 illustrates a torque vectoring device 700. The torque vectoring device 700 comprises a drive member 702, a first inner cage 704, a second inner cage 705, a first output ring 706, a first input member 707, a second output ring 708, a second input member 709, a first plurality of variator ball assemblies 710, a second plurality of variator ball assemblies 712, and a plurality of drive pinions 714. The first output ring 706, the first input member 707, the second output ring 708, and the second input member 709 are rotatably disposed within a housing 715. The first inner cage 704, the second inner cage 705, the first plurality of variator ball assemblies 710, and the second plurality of variator ball assemblies 712 are non-rotatably disposed within the housing 715. A volume between the first output ring 706 and the second output ring 708 may be filled with one of a traction fluid and an automatic transmission fluid. Each of the variator ball assemblies 710, 712 is respectively tiltably disposed between the inner cages 704, 705 and the housing 715. A first actuator assembly 716 and a second actuator assembly 718 disposed within the housing 715 respectively adjusts a position of the plurality of variator ball assemblies 710, 712, between the inner cages 704, 705 and the housing 715.

The drive member 702 is an annular member formed from a metal. The drive member 702 is unitary in construction; however, it is understood that the drive member 702 may comprise a plurality of components coupled together. The plurality of drive pinions 714 are rotatably disposed within apertures 719 formed in an inner surface of the drive member 702. The plurality of drive pinions 714 facilitates driving engagement between the drive member 702 and the input members 707, 709. A crown gear 720 is disposed about and coupled to an outer surface of the drive member 702. Alternately, it is understood that the crown gear 720 may be integrally formed with the drive member 702. Further, it is understood that the crown gear 720 may be replaced with another feature that facilitates driving engagement of the drive member 702 with a power source, such as through a drive shaft or a drive gear.

The first inner cage 704 is an annular member formed from a metal. An outer surface of the first inner cage 704 is configured to be coupled to each of the first variator ball assemblies 710 while permitting each of the first variator ball assemblies 710 to be tilted with respect to the first inner cage 704. The first inner cage 704 is restrained from rotating within the housing 715, as the first inner cage 704 is coupled to the housing 715, and cooperate to hold the variator ball assemblies 710.

The second inner cage 705 is an annular member formed from a metal. An outer surface of the second inner cage 705 is configured to be coupled to each of the second variator ball assemblies 712 while permitting each of the second variator ball assemblies 712 to be tilted with respect to the second inner cage 705. The second inner cage 705 is restrained from rotating within the housing 715, as the second inner cage 705 is coupled to the housing 715, and cooperate to hold the variator ball assemblies 712.

The first output ring 706 is an annular member formed from a metal. The first output ring 706 comprises an engagement end 722, a middle portion 724, and an output end 726. The first output ring 706 is rotatably disposed within the housing 715 and is free to rotate with respect thereto. The first output ring 706 is unitarily formed from a metal, however, it is understood that the first output ring 706 may comprise a plurality of components coupled together in any conventional manner.

The engagement end 722 defines an annular, conical surface that is configured to contact a portion of each of the first variator ball assemblies 710. The engagement end 722 is in rolling contact with the portion of each of the first variator ball assemblies 710 contacting the engagement end 722.

The middle portion 724 is a radially extending, substantially disk shaped portion of the first output ring 706; however, it is understood that the middle portion 724 may have other shapes. The output end 726 is an axially extending, sleeve shaped portion of the first output ring 706; however, it is understood that the output end 726 may have other shapes. An inner surface of the output end 726 defines a plurality of drive splines thereon, which facilitate driving engagement between the first output ring 706 and a first output shaft 728. Alternately, it is understood that the output end 726 may be configured with other features that facilitate driving engagement with the first output shaft 728.

The first input member 707 is an annular member formed from a metal. The first input member 707 comprises an engagement end 730 and a geared portion 732. The first input member 707 is rotatably disposed within the housing 715 and is free to rotate with respect thereto. The first input member 707 comprises a plurality of components coupled together in any conventional manner; however, it is understood that the first input member 707 may be unitary in construction.

The engagement end 730 defines an annular, conical surface that is configured to contact a portion of each of the first variator ball assemblies 710. The engagement end 730 is in rolling contact with the portion of each of the first variator ball assemblies 710 contacting the engagement end 730.

The geared portion 732 is a radially extending, substantially disk shaped portion of the first input member 707; however, it is understood that the geared portion 732 may have other shapes. The geared portion 732 forms a bevel gear, which is in driving engagement with the drive member 702 through the plurality of drive pinions 714.

The second output ring 708 is an annular member formed from a metal. The second output ring 708 comprises an engagement end 734, a middle portion 736, and an output end 738. The second output ring 708 is rotatably disposed within the housing 715 and is free to rotate with respect thereto. The second output ring 708 is unitarily formed from a metal, however, it is understood that the second output ring 708 may comprise a plurality of components coupled together in any conventional manner.

The engagement end 734 defines an annular, conical surface that is configured to contact a portion of each of the second variator ball assemblies 712. The engagement end 734 is in rolling contact with the portion of each of the second variator ball assemblies 712 contacting the engagement end 734.

The middle portion 736 is a radially extending, substantially disk shaped portion of the second output ring 708; however, it is understood that the middle portion 736 may have other shapes. The output end 738 is an axially extending, sleeve shaped portion of the second output ring 708; however, it is understood that the output end 738 may have other shapes. An inner surface of the output end 738 defines a plurality of drive splines thereon, which facilitate driving engagement between the second output ring 708 and a second output shaft 740. Alternately, it is understood that the output end 738 may be configured with other features that facilitate driving engagement with the second output shaft 740.

The second input member 709 is an annular member formed from a metal. The second input member 709 comprises an engagement end 742 and a geared portion 744. The second input member 709 is rotatably disposed within the housing 715 and is free to rotate with respect thereto. The second input member 709 comprises a plurality of components coupled together in any conventional manner; however, it is understood that the second input member 709 may be unitary in construction.

The engagement end 742 defines an annular, conical surface that is configured to contact a portion of each of the second variator ball assemblies 712. The engagement end 742 is in rolling contact with the portion of each of the second variator ball assemblies 712 contacting the engagement end 742.

The geared portion 744 is a radially extending, substantially disk shaped portion of the second input member 709; however, it is understood that the geared portion 744 may have other shapes. The geared portion 744 forms a bevel gear, which is in driving engagement with the drive member 702 through the plurality of drive pinions 714.

Each of the first variator ball assemblies 710 includes at least a first variator ball 746 and a first variator axis 748, which are formed from a hardened metal. An outer surface 750 of each of the first variator balls 746 is in contact with the engagement end 722 of the first output ring 706 and the engagement end 730 of the first input member 707. The first variator axis 748 is disposed through and coupled to the first variator ball 746. The first variator axis 748 is rotatably and tiltably coupled to the housing 715 and the first inner cage 704. Alternately, the first variator ball 746 may be rotatably coupled to the first variator axis 748 and the first variator axis 748 may be tiltably coupled to the housing 715 and the first inner cage 704. The torque vectoring device 700 includes at least three of the first variator ball assemblies 710; however it is understood that the torque vectoring device 700 may include more than three of the first variator ball assemblies 710.

Each of the second variator ball assemblies 712 includes at least a second variator ball 752 and a second variator axis 754, which are formed from a hardened metal. An outer surface 756 of each of the second variator balls 752 is in contact with the engagement end 734 of the second output ring 708 and the engagement end 742 of the second input member 709. The second variator axis 754 is disposed through and coupled to the second variator ball 752. The second variator axis 754 is rotatably and tiltably coupled to the housing 715 and the second inner cage 705. Alternately, the second variator ball 752 may be rotatably coupled to the second variator axis 754 and the second variator axis 754 may be tiltably coupled to the housing 715 and the second inner cage 705. The torque vectoring device 700 includes at least three of the second variator ball assemblies 712; however it is understood that the torque vectoring device 700 may include more than three of the second variator ball assemblies 712.

The plurality of drive pinions 714 is rotatably disposed within the apertures 719 formed in the inner surface of the drive member 702. The plurality of drive pinions 714 facilitates driving engagement between the drive member 702 and the input members 707, 709. Each of the drive pinion are gears formed from a metal. The drive member 702 rotatably holds and drives the drive pinions 714 in an annular array. The plurality of drive pinions 714 are in driving engagement with the geared portions 732, 744 of each of the input members 707, 709.

The first actuator assembly 716 disposed within the housing 715 adjusts a position of the plurality of the first variator ball assemblies 710 between the first inner cage 704 and the housing 715. The plurality of first variator ball assemblies 710 are simultaneously and similarly moved by the first actuator assembly 716. As a non-limiting example, the first actuator assembly 716 may be mechanically actuated by a member (not shown) disposed through a central perforation formed in at least one of the first output ring 706, the first input member 707, the second output ring 708, and the second input member 709. Alternately, it is understood that the first actuator assembly 716 may be hydraulically, electrically, or pneumatically actuated.

The second actuator assembly 718 disposed within the housing 715 adjusts a position of the plurality of second variator ball assemblies 712 between the second inner cage 705 and the housing 715. The plurality of second variator ball assemblies 712 are simultaneously and similarly moved by the second actuator assembly 718. As a non-limiting example, the second actuator assembly 718 may be mechanically actuated by a member (not shown) disposed through a central perforation formed in at least one of the first output ring 706, the first input member 707, the second output ring 708, and the second input member 709. Alternately, it is understood that the second actuator assembly 718 may be hydraulically, electrically, or pneumatically actuated.

The first output ring 706 and the second output ring 708 are in driving engagement with the drive member 702 through the plurality of drive pinions 714, the first input member 707, the second input member 709, the first variator ball assemblies 710, and the second variator ball assemblies 712. The plurality of drive pinions 714 drives the first input member 707 and the second input member 709, which drive the first variator ball assemblies 710 and the second variator ball assemblies 712. The plurality of drive pinions 714 ensures the first input member 707 and the second input member 709 may rotate with respect to one another when the differential function is needed.

To perform a torque vectoring function, the first actuator assembly 716 and the second actuator assembly 718 cause the variator axes 748, 754 of each of the first variator ball assemblies 710 and the second variator ball assemblies 712 to change by a predetermined or a calculated amount in the same direction. Such a change of the variator axes 748, 754 causes a torque split between the first output ring 706 and the second output ring 708 to be adjusted.

To perform a transmission function, the first actuator assembly 716 and the second actuator assembly 718 cause the variator axes 748, 754 of each of the first variator ball assemblies 710 and the second variator ball assemblies 712 to change by an equal amount in opposing directions. Such a change of the variator axes 748, 754 of each of the first variator ball assemblies 710 and the second variator ball assemblies 712 causes a gear ratio of the first output ring 706 and the second output ring 708 to be adjusted with respect to the drive member 702.

The torque vectoring device 700 may also be placed in a hybrid mode, where the transmission function and the torque vectoring function are performed simultaneously. To place the torque vectoring device 700 in the hybrid mode, the first actuator assembly 716 and the second actuator assembly 718 cause the variator axes 748, 754 of each of the first variator ball assemblies 710 and the second variator ball assemblies 712 to change by an unequal amount in either the same direction or in opposing directions. Such a change of the variator axes 748, 754 of each of the first variator ball assemblies 710 and the second variator ball assemblies 712 causes a gear ratio of the first output ring 706 and the second output ring 708 to be adjusted with respect to the drive member 702 and a torque split between the first output ring 706 and the second output ring 708 to be adjusted.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A torque vectoring device comprising:
    an outer cage drivingly engaged with a power source;
    an inner cage operably coupled to the outer cage;
    a plurality of variator ball assemblies each comprising a variator ball and a variator ball axle disposed through and coupled to the variator ball, said axle tiltably coupled to the outer cage and the inner cage;
    a first idling ring rotatably disposed adjacent to the inner cage;
    a second idling ring rotatably disposed adjacent to the inner cage;
    a first output ring frictionally engaged with a surface of at least a portion of the variator ball assemblies to transmit torque from the outer cage to the first output ring; and
    a second output ring frictionally engaged with a surface of at least a portion of the variator ball assemblies to transmit torque from the outer cage to the second output ring;
    wherein the first idling ring, the second idling ring, the first output ring and the second output ring are rotatably disposed within the outer cage, and
    wherein each variator ball axis of the variator ball assemblies is tiltably disposed between and drivingly engaged with the inner cage and the outer cage,
    wherein a torque distribution between the first output ring and the second output ring may be adjusted by tilting the plurality of variator ball assemblies and the variator ball assemblies facilitate a differential action between the first output ring and the second output ring;
    an actuator assembly coupled to the inner cage and disposed within the outer cage;
    wherein the actuator assembly adjusts a position of the plurality of variator ball assemblies between the inner cage and the outer cage.

2. The torque vectoring device according to claim 1, wherein the plurality of variator ball assemblies comprises an annular array of three or more variator ball assemblies.

3. The torque vectoring device according to claim 1, wherein the first output ring and the second output ring are frictionally engaged with at least a portion of each of the variator ball assemblies above a horizontal axis of the variator balls.

4. The torque vectoring device according to claim 1, wherein the first output ring and the second output ring each include a conical surface for frictionally engaging the surface of at least a portion of the variator ball assemblies.

5. The torque vectoring device according to claim 1, further comprising a crown gear, the crown gear coupled to the outer cage.

6. The torque vectoring device according to claim 1, wherein the outer cage is disposed intermediate the first output ring and the second output ring.

7. The torque vectoring device according to claim 1, wherein a clutch is not required to direct torque between a first axle and a second axle.

8. The torque vectoring device according to claim 1, wherein said device is configured to perform a torque distribution between the first output ring and the second output ring by tilting at least a portion of the plurality of variator ball assemblies and the variator ball assemblies facilitate a differential action between the first output ring and the second output ring.

9. The torque vectoring device according to claim 1, wherein said device is configured to perform a differential function with the ability to adjust a drive ratio.

10. A torque vectoring device comprising:
    an outer cage drivingly engaged with a power source;
    an inner cage operably coupled to the outer cage;
    a plurality of variator ball assemblies each comprising a variator ball and a variator ball axle disposed through and coupled to the variator ball, said axle tiltably coupled to the outer cage and the inner cage;
    a first idling ring rotatably disposed adjacent to the inner cage;
    a second idling ring rotatably disposed adjacent to the inner cage;
    a first output ring in rolling contact with a surface of at least a portion of the variator ball assemblies to transmit torque from the outer cage to the first output ring; and
    a second output ring in rolling contact with a surface of at least a portion of the variator ball assemblies to transmit torque from the outer cage to the second output ring;
    wherein the first idling ring, the second idling ring, the first output ring and the second output ring are rotatably disposed within the outer cage, and
    wherein each variator ball axis of the variator ball assemblies is tiltably disposed between and drivingly engaged with the inner cage and the outer cage,
    wherein a torque distribution between the first output ring and the second output ring may be adjusted by tilting the plurality of variator ball assemblies and the variator ball assemblies facilitate a differential action between the first output ring and the second output ring;
    an actuator assembly coupled to the inner cage and disposed within the outer cage;
    wherein the actuator assembly adjusts a position of the plurality of variator ball assemblies between the inner cage and the outer cage.

* * * * *